US010762009B2

(12) United States Patent
Choi

(10) Patent No.: US 10,762,009 B2
(45) Date of Patent: Sep. 1, 2020

(54) DATA PROCESSING SYSTEM INCLUDING MEMORY SYSTEMS COUPLED THROUGH INTERNAL CHANNEL

(71) Applicant: SK hynix Inc., Gyeonggi-do (KR)

(72) Inventor: Hae-Gi Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/421,775

(22) Filed: May 24, 2019

(65) Prior Publication Data
US 2020/0097420 A1  Mar. 26, 2020

(30) Foreign Application Priority Data
Sep. 21, 2018  (KR) .................. 10-2018-0114073

(51) Int. Cl.
*G06F 13/38* (2006.01)
*G06F 13/16* (2006.01)
*G06F 3/06* (2006.01)

(52) U.S. Cl.
CPC ........ *G06F 13/1668* (2013.01); *G06F 3/0604* (2013.01); *G06F 3/0647* (2013.01); *G06F 3/0688* (2013.01)

(58) Field of Classification Search
None
See application file for complete search history.

(56) References Cited

U.S. PATENT DOCUMENTS

| 4,875,157 | A  | * | 10/1989 | Frimmel, Jr. ....... G06F 12/0284 711/211 |
| 7,711,887 | B1 | * | 5/2010 | Warnes ............... G06F 13/1694 710/315 |
| 8,266,367 | B2 | * | 9/2012 | Yu ......................... G06F 3/0608 711/103 |
| 8,924,617 | B2 | * | 12/2014 | Aleksic .................... G06T 1/60 710/305 |
| 8,935,465 | B1 |   | 1/2015 | Shaharabany et al. |
| 2014/0108705 | A1 |   | 4/2014 | Gorobets |
| 2015/0363131 | A1 |   | 12/2015 | Sinclair |
| 2017/0017590 | A1 |   | 1/2017 | Berman et al. |
| 2020/0004446 | A1 | * | 1/2020 | Palmer .................... G06F 3/061 |

* cited by examiner

*Primary Examiner* — Cheng Yuan Tseng
(74) *Attorney, Agent, or Firm* — IP & T Group LLP

(57) ABSTRACT

A data processing system includes: a first memory system coupled to a host through a first external channel, a second memory system coupled to the host through a second external channel, and an internal channel suitable for coupling the first and second memory systems with each other, the host, when read-requesting first and second data to the first memory system, transfers a first external channel control information for selecting sole use of the first external channel or simultaneous use of the first and second external channels, to the first and second memory systems, the first memory system, when the first external channel control information indicates simultaneous use, the first memory system outputs the first data through the first external channel and outputs the second data through the internal channel, and the second memory system outputs the second data inputted through the internal channel, through the second external channel.

20 Claims, 17 Drawing Sheets

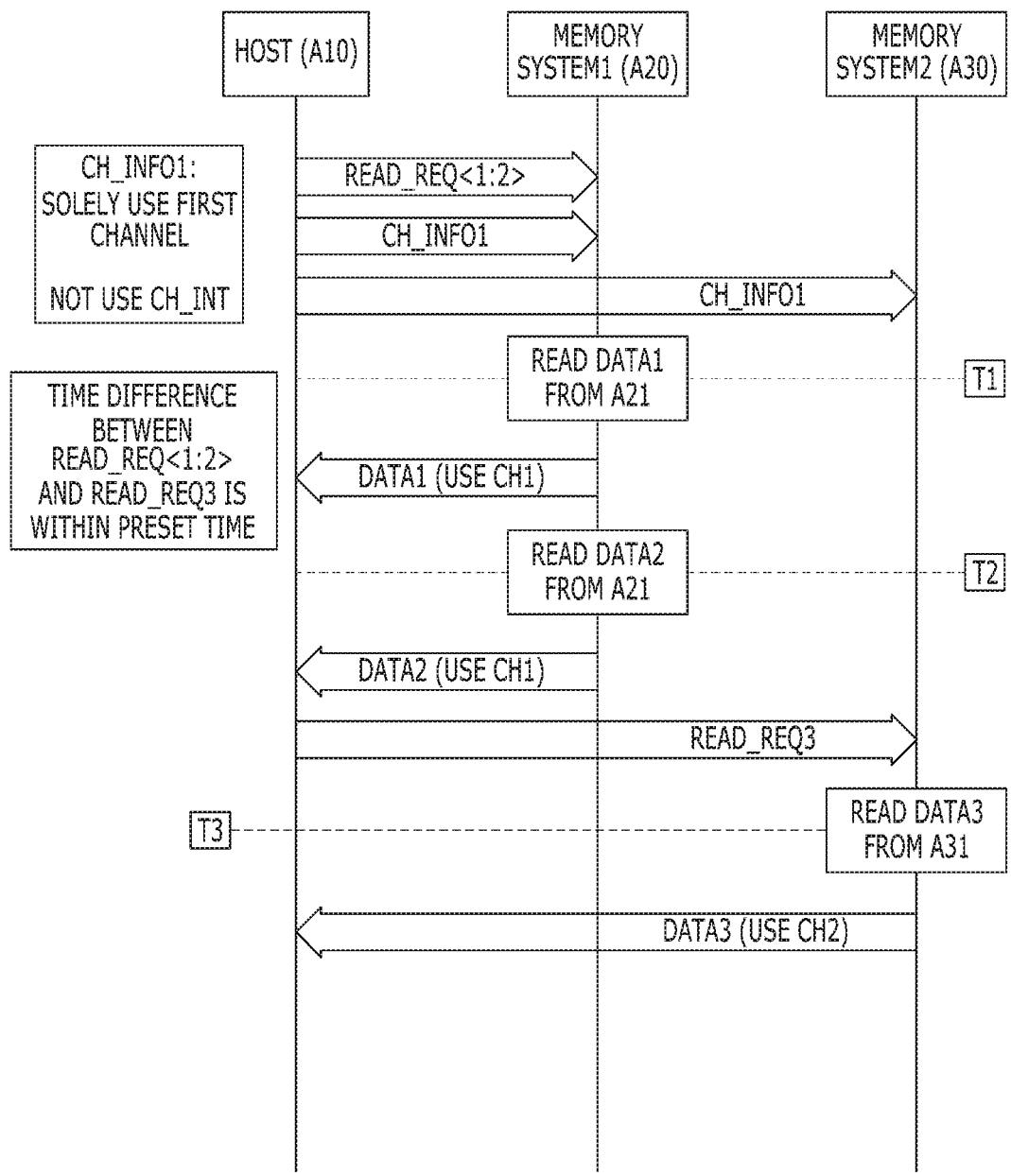

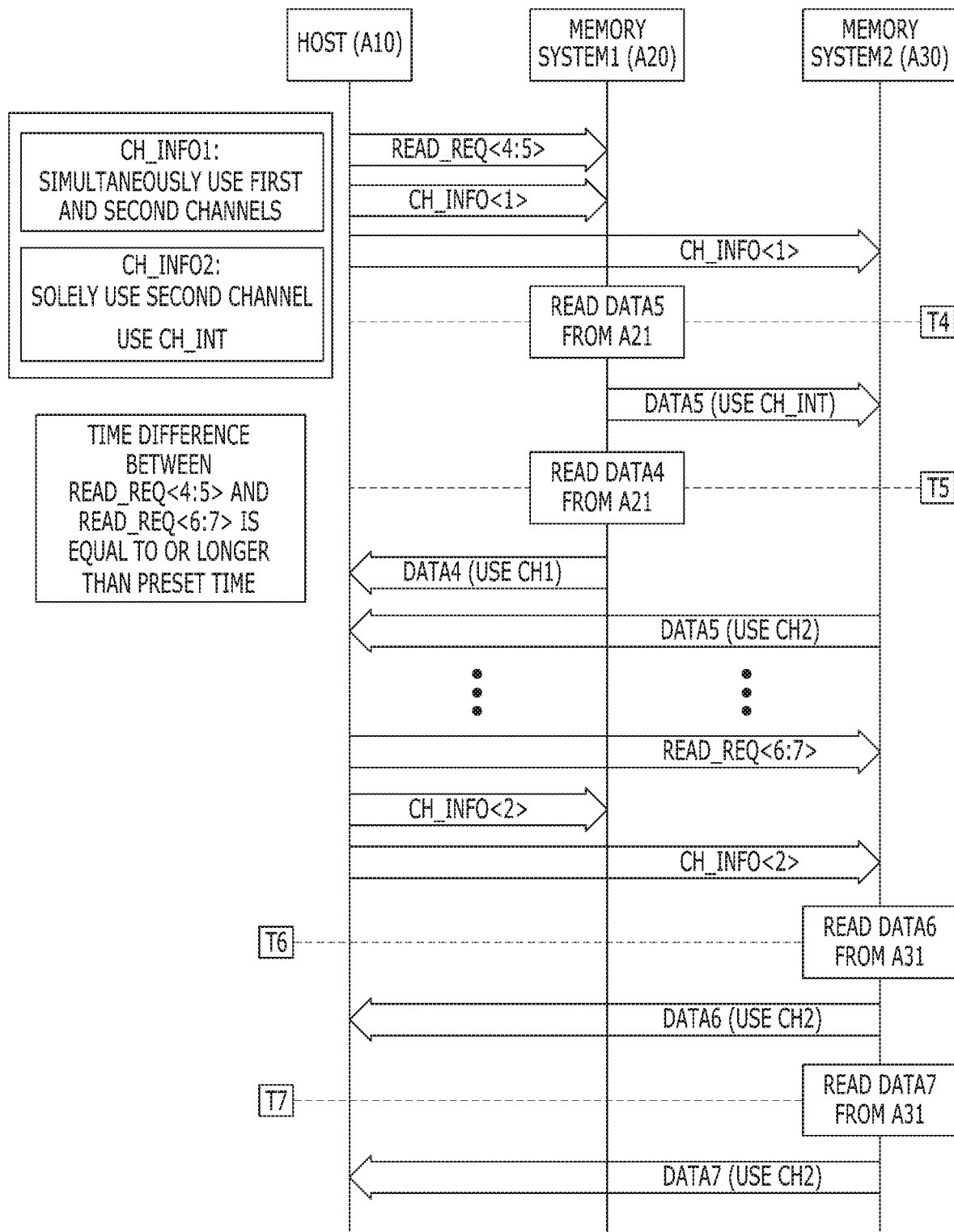

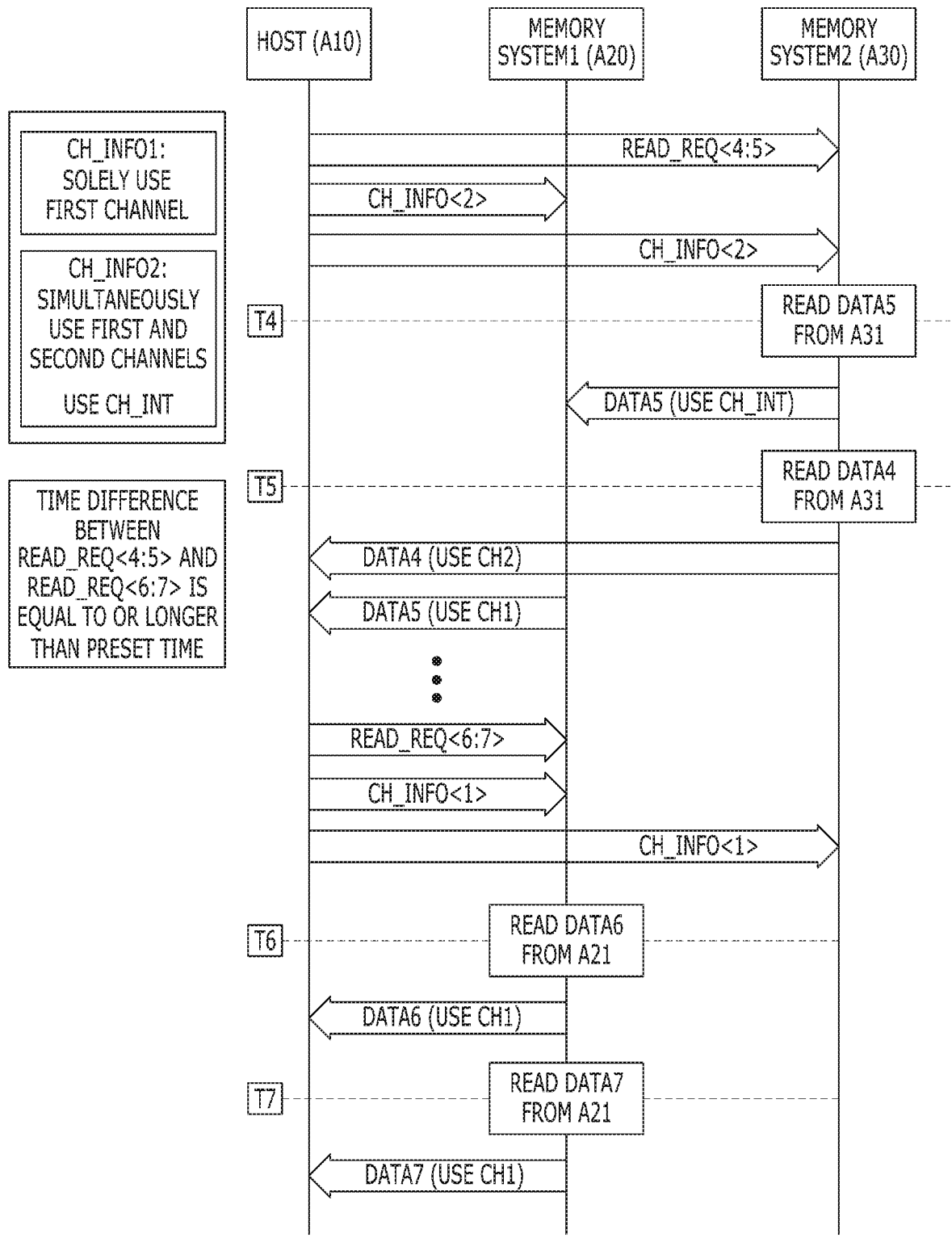

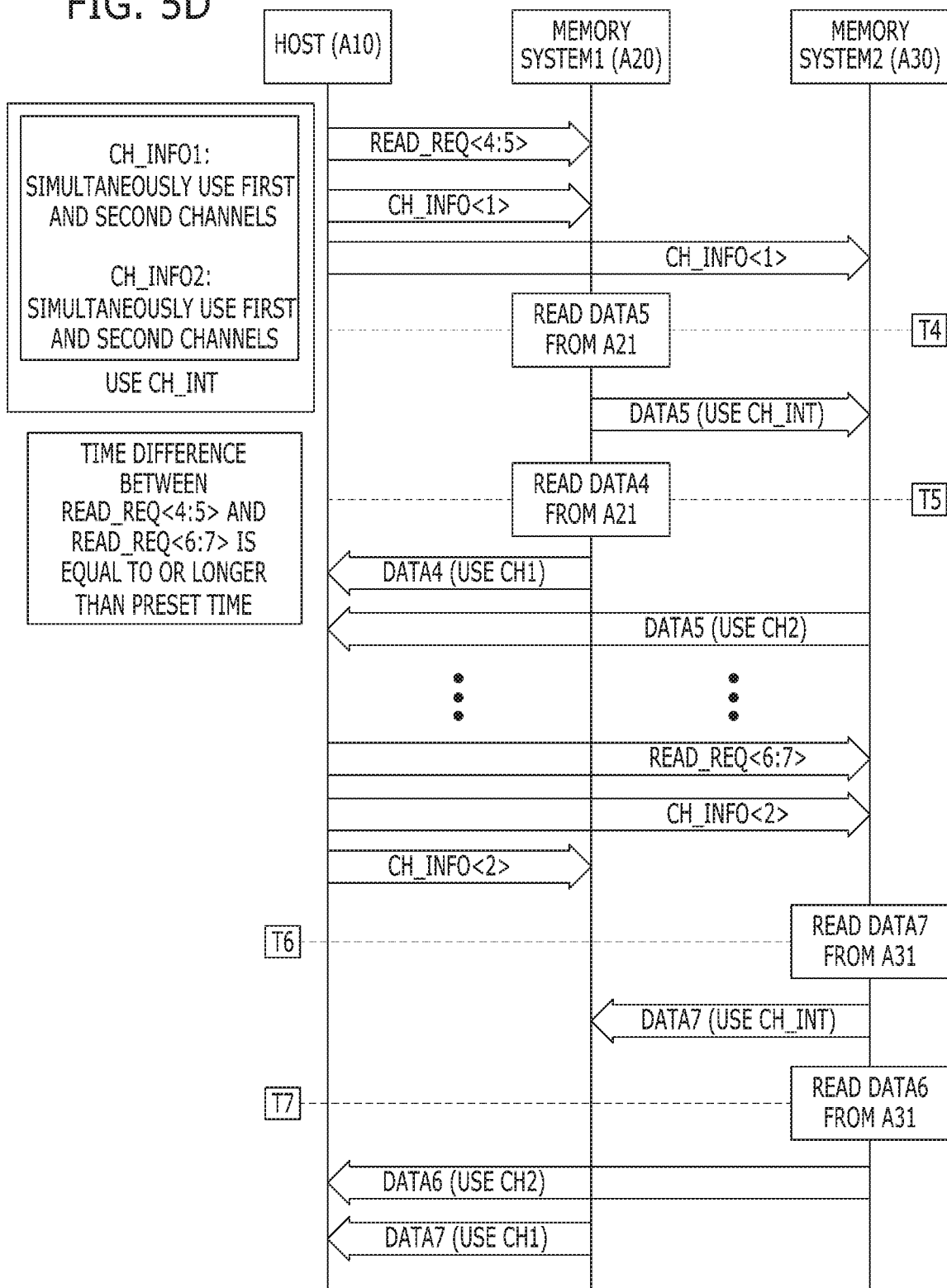

DATA PROCESSING SYSTEM INCLUDING MEMORY SYSTEMS COUPLED THROUGH INTERNAL CHANNEL

CROSS-REFERENCE TO RELATED APPLICATION

This application claims priority under 35 U.S.C. § 119 to Korean Patent Application No. 10-2018-0114073 filed on Sep. 21, 2018, which is incorporated herein by reference in its entirety.

BACKGROUND

1. Field

Various embodiments relate to a data processing system and, more particularly, to a data processing system including a plurality of memory systems.

2. Discussion of the Related Art

The computer environment paradigm has changed to ubiquitous computing systems that can be used anytime and anywhere. As a result, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

Various embodiments are directed to a data processing system capable of effectively transferring data between a plurality of memory systems and a host.

In an embodiment, a data processing system may include: a first memory system including a first nonvolatile memory device and coupled to a host through a first external channel; a second memory system including a second nonvolatile memory device and coupled to the host through a second external channel; and an internal channel suitable for coupling the first and second memory systems with each other. The host, when read-requesting first and second data to the first memory system, may transfer a first external channel control information for selecting sole use of the first external channel or simultaneous use of the first and second external channels, to the first and second memory systems. The first memory system, when the first external channel control information indicates simultaneous use, may output the first data to the host through the first external channel and may output the second data to the second memory system through the internal channel. The second memory system, when the first external channel control information indicates simultaneous use, may output the second data inputted from the first memory system through the internal channel, to the host through the second external channel.

The first memory system, when the first external channel control information indicates simultaneous use, may read the second data from the first nonvolatile memory device to a first internal bus at a first time and may output the second data loaded in the first internal bus, to the second memory system through the internal channel, and may read the first data to the first internal bus at a second time subsequent to the first time and may output the first data loaded in the first internal bus, to the host through the first external channel, and when the first external channel control information indicates simultaneous use, may read the first data from the first nonvolatile memory device to the first internal bus at the first time and may output the first data loaded in the first internal bus, to the host through the first external channel, and may read the second data to the first internal bus at the second time and may output the second data loaded in the first internal bus, to the host through the first external channel.

The second memory system, when the first external channel control information indicates sole use at a third time earlier than the first time or later than the second time, may read third data from the second nonvolatile memory device to a second internal bus and may output the third data to the host through the second external channel, and when the first external channel control information indicates simultaneous use, may receive the second data inputted through the internal channel at the first time, to the second internal bus, and may output the second data to the host through the second external channel.

The first memory system, when the first external channel control information indicates sole use, may open the first internal bus and the internal channel.

The host, when a read or write request to the second memory system is not scheduled for at least a preset time from a time when read-requesting the first and second data to the first memory system, may transfer the first external channel control information for selecting simultaneous use of the first and second external channels, to the first and second memory systems.

The host, when read-requesting fourth and fifth data to the second memory system, may transfer a second external channel control information for selecting sole use of the second external channel or simultaneous use of the first and second external channels, to the first and second memory systems, the second memory system, when the second external channel control information indicates a simultaneous use, may output the fourth data to the host through the second external channel, and may output the fifth data to the first memory system through the internal channel, and the first memory system, when the second external channel control information indicates simultaneous use, may output the fifth data inputted from the second memory system through the internal channel, to the host through the first external channel.

The second memory system, when the second external channel control information indicates simultaneous use, may read the fifth data from the second nonvolatile memory device to the second internal bus at a fourth time and may output the fifth data loaded in the second internal bus, to the first memory system through the internal channel, and may read the fourth data at a fifth time subsequent to the fourth time and may output the fourth data loaded in the second internal bus, to the host through the second external channel, when the second external channel control information indicates sole use, may read the fourth data from the second nonvolatile memory device to the second internal bus at the fourth time and may output the fourth data loaded in the second internal bus, to the host through the second external channel, and may read the fifth data to the second internal bus at the fifth time and may output the fifth data loaded in the second internal bus, to the host through the second external channel; and the first and second times and the fourth and fifth times may do not overlap with each other.

The first memory system, when the second external channel control information indicates sole use at a sixth time earlier than the fourth time or later than the fifth time, may read sixth data from the first nonvolatile memory device to the first internal bus and may output the sixth data to the host through the first external channel, when the second external channel control information indicates simultaneous use, may receive the fifth data inputted through the internal channel at the fourth time, to the first internal bus, and may output the fifth data to the host through the first external channel, and the first to third times and the fourth to sixth times may do not overlap with each other.

The first memory system, when the first external channel control information indicates sole use, may open transfer of data from the first internal bus to the internal channel, and may close transfer of data from the internal channel to the first internal bus, and the second memory system, when the second external channel control information indicates sole use, may open transfer of data from the second internal bus to the internal channel, and may close transfer of data from the internal channel to the second internal bus.

The host, when a read or write request to the second memory system is not scheduled for at least a preset time from a time when read-requesting the first and second data to the first memory system, may transfer the first external channel control information for selecting simultaneous use of the first and second external channels, to the first and second memory systems, and when a read or write request to the first memory system is not scheduled for at least the preset time from a time when read-requesting the fourth and fifth data to the second memory system, may transfer the second external channel control information for selecting simultaneous use of the first and second external channels, to the first and second memory systems.

In an embodiment, a data processing system may include: a first memory system including a first nonvolatile memory device and coupled to a host through a first external channel; a second memory system including a second nonvolatile memory device and coupled to the host through a second external channel; and an internal channel suitable for coupling the first and second memory systems with each other. The first memory system, when receiving read requests for first and second data from the host, may output the first data to the host through the first external channel and may output the second data to the second memory system through the internal channel, in a first simultaneous transfer mode that is entered by the host, and may output the first and second data to the host through the first external channel in a first sole transfer mode that is entered by the host. The second memory system, in the first simultaneous transfer mode, may output the second data inputted from the first memory system through the internal channel, to the host through the second external channel.

The first memory system, when the first simultaneous transfer mode is entered, according to read requests from the host, may read the second data from the first nonvolatile memory device to a first internal bus at a first time and may output the second data loaded in the first internal bus, to the second memory system through the internal channel, and may read the first data to the first internal bus at a second time subsequent to the first time and may output the first data loaded in the first internal bus, to the host through the first external channel, and when the first sole transfer mode is entered, according to read requests from the host, may read the first data from the first nonvolatile memory device to the first internal bus at the first time and may output the first data loaded in the first internal bus, to the host through the first external channel, and may read the second data to the first internal bus at the second time and may output the second data loaded in the first internal bus, to the host through the first external channel.

The second memory system, when the first sole transfer mode is entered, at a third time earlier than the first time or later than the second time, according to a read request from the host, may read third data from the second nonvolatile memory device to a second internal bus and may output the third data to the host through the second external channel, and when the first simultaneous transfer mode is entered, may receive the second data inputted through the internal channel at the first time, to the second internal bus, and may output the second data to the host through the second external channel.

The first memory system, in the first sole transfer mode, may open the first internal bus and the internal channel.

The host, when a read or write request to the second memory system is not scheduled for at least a preset time from a time when read-requesting the first and second data to the first memory system, may enter the first simultaneous transfer mode.

The second memory system, when receiving read requests for fourth and fifth data from the host, may output the fourth data to the host through the second external channel and may output the fifth data to the first memory system through the internal channel, in a second simultaneous transfer mode that is entered by the host, and may output the fourth and fifth data to the host through the second external channel in a second sole transfer mode that is entered by the host, and the first memory system, in the second simultaneous transfer mode, may output the fifth data inputted from the second memory system through the internal channel, to the host through the first external channel.

The second memory system, when the second simultaneous transfer mode is entered, according to read requests from the host, may read the fifth data from the second nonvolatile memory device to the second internal bus at a fourth time and may output the fifth data loaded in the second internal bus, to the first memory system through the internal channel, and may read the fourth data at a fifth time subsequent to the fourth time and may output the fourth data loaded in the second internal bus, to the host through the second external channel, when the second sole transfer mode is entered, according to read requests from the host, may read the fourth data from the second nonvolatile memory device to the second internal bus at the fourth time and may output the fourth data loaded in the second internal bus, to the host through the second external channel, and may read the fifth data to the second internal bus at the fifth time and may output the fifth data loaded in the second internal bus, to the host through the second external channel, and the first and second times and the fourth and fifth times may do not overlap with each other.

The first memory system, when the second sole transfer mode is entered, at a sixth time earlier than the fourth time or later than the fifth time, according to a read request from the host, may read sixth data from the first nonvolatile memory device to the first internal bus and may output the sixth data to the host through the first external channel, when the second simultaneous transfer mode is entered, may receive the fifth data inputted through the internal channel at the fourth time, to the first internal bus, and may output the fifth data to the host through the first external channel, and the first to third times and the fourth to sixth times may do not overlap with each other.

The first memory system, in the first sole transfer mode, may open transfer of data from the first internal bus to the internal channel, and may close transfer of data from the internal channel to the first internal bus, and the second memory system, in the second sole transfer mode, may open transfer of data from the second internal bus to the internal channel, and may close transfer of data from the internal channel to the second internal bus.

The host, when a read or write request to the second memory system is not scheduled for at least a preset time from a time when read-requesting the first and second data to the first memory system, may enter the first simultaneous transfer mode, and when a read or write request to the first memory system is not scheduled for at least the preset time from a time when read-requesting the fourth and fifth data to the second memory system, may enter the second simultaneous transfer mode.

In an embodiment, a data processing may include: a first controller coupled to a host through a first external channel; a memory device; and a second controller coupled to the host through a second external channel, coupled to the first controller through an internal channel, and configured to: may control the memory device to read first and second data in response to first and second successive read requests from the host; and may provide the second data to the host through the second external channel while providing the first data to the first controller through the internal channel, the first controller may be configured to transfer the first data to the host through the first external channel.

The present technology includes external channels to couple a plurality of memory systems with a host. Also, the present technology further includes an internal channel for the plurality of memory systems to transfer data to each other.

Due to this fact, when read operations requested from the host are intensive on a specific memory system among the plurality of memory systems, data read from the specific memory system may be shared with a remaining memory system except the specific memory system among the plurality of memory systems through the internal channel. Through this, data read from the specific memory system may be outputted to the host by using not only the external channel of the specific memory system but also the external channel of the remaining memory system.

As a consequence, even in the case where read requests of the host are intensive on a specific memory system, it is possible to effectively provide read data to the host.

BRIEF DESCRIPTION OF THE DRAWINGS

FIGS. 3A to 3D are diagrams of examples of operations of the data processing system including a plurality of memory systems in accordance with an embodiment of the present disclosure.

FIGS. 5A to 5H are diagrams of examples of operations of the data processing system including a plurality of memory systems in accordance with an embodiment of the present disclosure.

DETAILED DESCRIPTION

Figure 1:
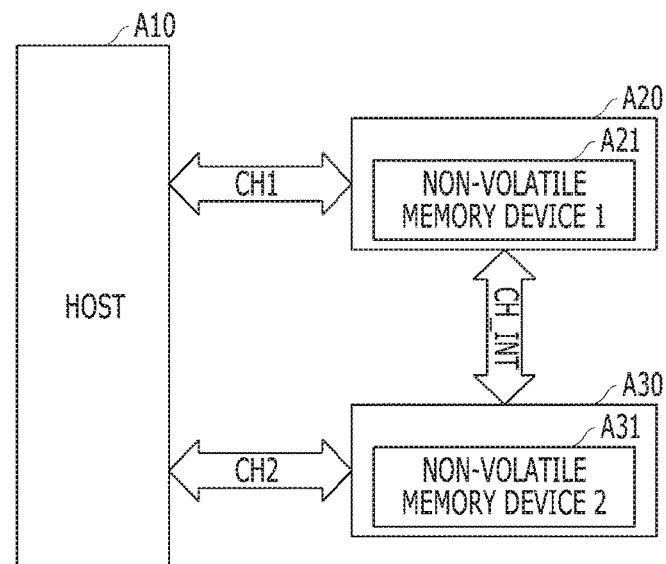
FIGS. 1, 2A and 2B are diagrams of a data processing system including a plurality of memory systems in accordance with an embodiment of the present disclosure.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Figure 2A:
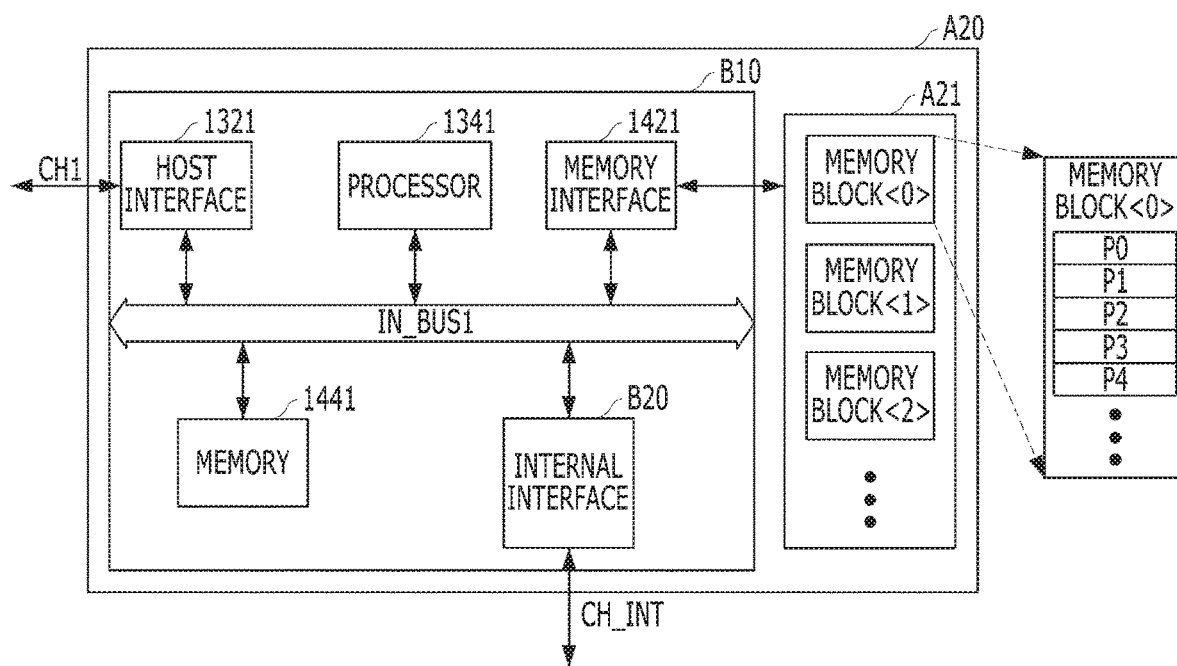
Figure 2B:
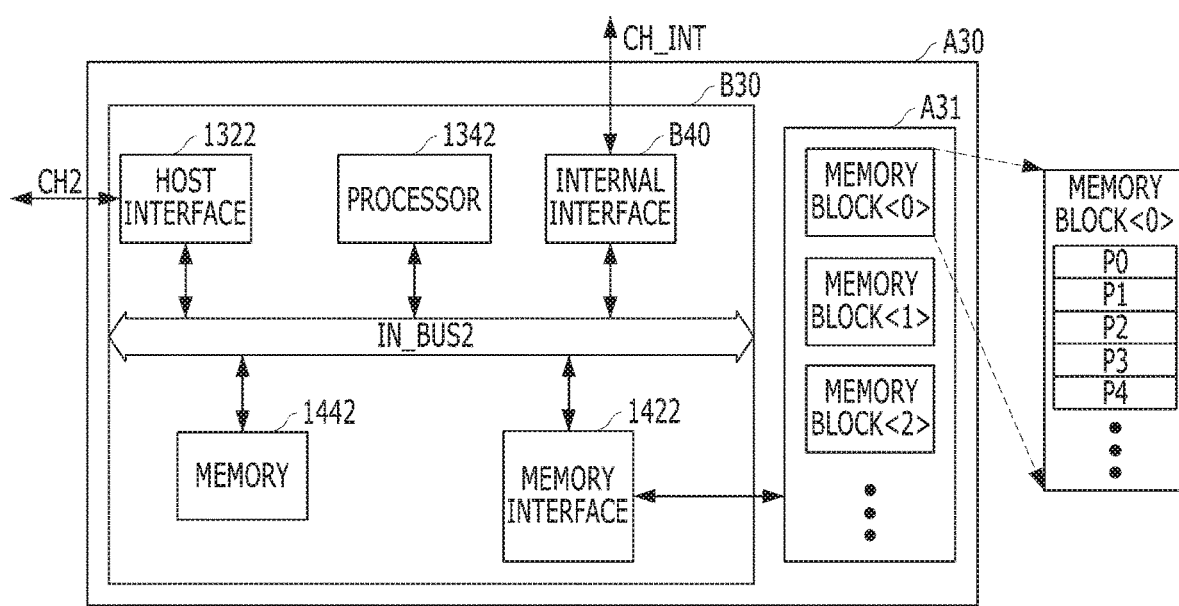

FIGS. 1, 2A and 2B are diagrams of a data processing system including a plurality of memory systems A20 and A30 in accordance with an embodiment of the present disclosure.

Referring to FIG. 1, the data processing system in accordance with the embodiment of the present disclosure includes a host A10 and first and second memory systems A20 and A30. Although FIG. shows two memory systems A20 and A30, the number of memory systems is not limited to such a number and may vary depending on an embodiment.

The host A10 transmits a plurality of requests to the memory systems A20 and A30, and accordingly, the memory systems A20 and A30 perform operations corresponding to the requests.

The memory systems A20 and A30 operate in response to a request of the host A10, for example, store data. In other words, each of the memory systems A20 and A30 may be used as a main memory device and an auxiliary memory device of the host A10. Each of the memory systems A20 and A30 may be realized by any one of various kinds of storage devices, depending on a host interface protocol which is coupled with the host A10. For example, each of the memory systems A20 and A30 may be realized by any one of various kinds of storage devices such as a solid state drive (SSD), a multimedia card in the form of an MMC, an eMMC (embedded MMC), an RS-MMC (reduced size MMC) and a micro-MMC, a secure digital card in the form of an SD, a mini-SD and a micro-SD, a universal serial bus (USB) storage device, a universal flash storage (UFS) device, a compact flash (CF) card, a smart media card, a memory stick, and so forth.

Each of the memory systems A20 and A30 may be integrated into one semiconductor device and may configure a memory card. For instance, each of the memory systems A20 and A30 may configure a memory card such as a Personal Computer Memory Card International Association (PCMCIA) card, a compact flash (CF) card, a smart media card in the form of an SM and an SMC, a memory stick, a multimedia card in the form of an MMC, an RS-MMC and a micro-MMC, a secure digital card in the form of an SD, a mini-SD, a micro-SD and an SDHC, and a universal flash storage (UFS) device.

For another instance, each of the memory systems A20 and A30 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID (radio frequency identification) device, or one of various component elements configuring a computing system.

Each of the memory systems A20 and A30 may include a storage device such as a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM), a resistive RAM (RRAM) and a flash memory.

The first memory system A20 is coupled to the host A10 through a first external channel CH1. The first memory system A20 includes a first nonvolatile memory device A21 for storing data transferred from the host A10.

The second memory system A30 is coupled to the host A10 through a second external channel CH2. The second memory system A30 includes a second nonvolatile memory device A31 for storing data transferred from the host A10.

It is to be noted that the number of external channels may vary depending on the number of memory systems in the data processing system.

The first memory system A20 and the second memory system A30 are coupled with each other through an internal channel CH_INT. That is, the first memory system A20 and the second memory system A30 may transfer data to each other through the internal channel CH_INT.

Since the first memory system A20 and the second memory system A30 may be coupled with each other through the internal channel CH_INT and may exchange data with each other, the host A10, the first memory system A20 and the second memory system A30 may perform the following operations.

First, when intensively read-requesting a plurality of data (not shown) to only one among the first and second memory systems A20 and A30, the host A10 may select whether to solely use only the first external channel CH1 or simultaneously use the first external channel CH1 and the second external channel CH2.

For example, when read-requesting first and second data (not shown) stored in the first memory system A20, the host A10 may select whether to solely use only the first external channel CH1 for coupling the first memory system A20 and the host MO or simultaneously use the first external channel CH1 and the second external channel CH2 for coupling the second memory system A30 and the host A10.

Similarly, when read-requesting fourth and fifth data (not shown) stored in the second memory system A30, the host A10 may select whether to solely use only the second external channel CH2 for coupling the second memory system A30 and the host A10 or simultaneously use the second external channel CH2 and the first external channel CH1 for coupling the first memory system A20 and the host A10.

As a first scheme for the selection, when successively read-requesting first and second data to the first memory system A20 or the second memory system A30, the host A10 may provide a channel control information to the first and second memory systems A20 and A30 to select the sole use of the first external channel CH1 or the second external channel CH2 or the simultaneous use of the first and second external channels CH1 and CH2.

For example, when successively read-requesting first and second data (not shown) to the first memory system A20, the host A10 may provide the first and second memory systems A20 and A30 with a first external channel control information CH_INFO1 (not shown) for selecting the sole use of the first external channel CH1 or the simultaneous use of the first and second external channels CH1 and CH2.

Also, when successively read-requesting fourth and fifth data (not shown) to the second memory system A30, the host A10 may provide the first and second memory systems A20 and A30 with a second external channel control information CH_INFO2 (not shown) for selecting the sole use of the second external channel CH2 or the simultaneous use of the first and second external channels CH1 and CH2.

The respective first and second memory systems A20 and A30 may be aware whether the host A10 has selected to simultaneously use the first and second external channels CH1 and CH2 or has selected to use only the first external channel CH1 or the second external channel CH2 according to the first external channel control information CH_INFO1 and the second external channel control information CH_INFO2.

In detail, in the case where the simultaneous use of the first and second external channels CH1 and CH2 is selected according to the first external channel control information CH_INFO1, the first memory system A20 outputs any of the first and second data read-requested from the host A10, for example, the first data, to the host A10 through the first external channel CH1, and outputs the remaining data, for example, the second data, to the second memory system A30 through the internal channel CH_INT.

Accordingly, in the case where the simultaneous use of the first and second external channels CH1 and CH2 is selected according to the first external channel control information CH_INFO1, the second memory system A30 transfers the data (e.g., the second data) from the first memory system A20 to the host A10 through the internal channel CH_INT and the second external channel CH2.

Conversely, in the case where the sole use of the first external channel CH1 is selected according to the first external channel control information CH_INFO1, the first memory system A20 outputs any of the first and second data read-requested from the host A10, for example, the first data, to the host A10 through the first external channel CH1, and then, outputs the remaining data, for example, the second data, to the host A10 through the first external channel CH1.

Further, in the case where the simultaneous use of the first and second external channels CH1 and CH2 is selected according to the second external channel control information CH_INFO2, the second memory system A30 outputs any of the fourth and fifth data read-requested from the host A10, for example, the fourth data, to the host A10 through the second external channel CH2, and outputs the remaining data, for example, the fifth data, to the first memory system A20 through the internal channel CH_INT.

Accordingly, in the case where the simultaneous use of the first and second external channels CH1 and CH2 is selected according to the second external channel control information CH_INFO2, the first memory system A20 transfers the data (e.g., the fifth data) from the second memory system A30 to the host A10 through the internal channel CH_INT and the first external channel CH1.

Conversely, in the case where the sole use of the second external channel CH2 is selected according to the second external channel control information CH_INFO2, the second memory system A30 outputs any of the fourth and fifth data read-requested from the host A10, for example, the fourth data, to the host A10 through the second external channel CH2, and then, outputs the remaining data, for example, the fifth data, to the host A10 through the second external channel CH2.

In the case where a read or write request to the second memory system A30 is not scheduled for a preset time or longer from a time of a read request to the first memory system A20, the host A10 provides the first and second memory systems A20 and A30 with the first external channel control information CH_INFO1 for selecting the simultaneous use of the first and second external channels CH1 and CH2 for the read request to the first memory system A20.

Also, in the case where a read or write request to the first memory system A20 is not scheduled for a preset time or longer from a time of a read request to the second memory system A30, the host A10 provides the first and second memory systems A20 and A30 with the second external channel control information CH_INFO2 for selecting the simultaneous use of the first and second external channels CH1 and CH2 for the read request to the second memory system A30.

Conversely, in the case where a read or write request to the second memory system A30 is scheduled within the preset time from a time of a read request to the first memory system A20, the host A10 provides the first and second memory systems A20 and A30 with the first external channel control information CH_INFO1 for selecting the sole use of the first external channel CH1 for the read request to the first memory system A20.

Also, in the case where a read or write request to the first memory system A20 is not scheduled within the preset time from a time of a read request to the second memory system A30, the host A10 provides the first and second memory systems A20 and A30 with the second external channel control information CH_INFO2 for selecting the sole use of the second external channel CH2 for the read request to the second memory system A30.

As a second scheme for the selection, when successively read-requesting first and second data to the first memory system A20 or the second memory system A30, the host A10 may enter a specific operation mode to select the sole use of the first external channel CH1 or the second external channel CH2 or the simultaneous use of the first and second external channels CH1 and CH2.

For example, when successively read-requesting first and second data to the first memory system A20, the host A10 may enter a first sole transfer mode to select the sole use of the first external channel CH1.

Also, when successively read-requesting first and second data to the first memory system A20, the host A10 may enter a first simultaneous transfer mode to select the simultaneous use of the first and second external channels CH1 and CH2.

When successively read-requesting fourth and fifth data to the second memory system A30, the host A10 may enter a second sole transfer mode to select the sole use of the second external channel CH2.

Furthermore, when successively read-requesting fourth and fifth data to the second memory system A30, the host A10 may enter a second simultaneous transfer mode to select the simultaneous use of the first and second external channels CH1 and CH2.

The respective first and second memory systems A20 and A30 may enter the first sole transfer mode, the second sole transfer mode, the first simultaneous transfer mode or the second simultaneous transfer mode by a mode-enter request provided from the host A10, and, through the mode-enter request, may be aware whether the host A10 has selected to simultaneously use the first and second external channels CH1 and CH2 or has selected to use only the first external channel CH1 or the second external channel CH2.

In this regard, the host A10 may include a notice as the mode-enter request for notifying the first and second memory systems A20 and A30 of the entry to the first sole transfer mode, the second sole transfer mode, the first simultaneous transfer mode or the second simultaneous transfer mode, in a specific request to be provided to the first and second memory systems A20 and A30. The notice may be included in the request in the form of context.

The first memory system A20 may transfer the notice as the mode-enter request for notifying the entry to the first sole transfer mode or the first simultaneous transfer mode, which is received from the host A10 through a request to the first memory system A20, to the second memory system A30 through the internal channel CH_INT.

Similarly, the second memory system A30 may transfer the notice as the mode-enter request for notifying the entry to the second sole transfer mode or the second simultaneous transfer mode, which is received from the host A10 through a request to the second memory system A30, to the first memory system A20 through the internal channel CH_INT.

For example, when providing the first memory system A20 with read requests for successively reading first and second data, the host A10 may include a notice as the mode-enter request for notifying the entry to the first sole transfer mode or the first simultaneous transfer mode in the read requests in the form of context. Then, the first memory system A20 may transfer the provided notice to the second memory system A30 through the internal channel CH_INT.

Similarly, when providing the second memory system A30 with read requests for successively reading fourth and fifth data, the host A10 may include a notice as the mode-enter request for notifying the entry to the second sole transfer mode or the second simultaneous transfer mode in the read requests in the form of context. Then, the second memory system A30 may transfer the provided notice to the first memory system A20 through the internal channel CH_INT.

For reference, the fact that the notice as the mode-enter request is included in a request in the form of context means that some predetermined bits among a plurality of reserved bits included in the request are set to have predetermined values representing the notice.

In detail, in the case where the first simultaneous transfer mode is entered, the first memory system A20 outputs any of the first and second data read-requested from the host A10, for example, the first data, to the host A10 through the first external channel CH1, and outputs the remaining data, for example, the second data, to the second memory system A30 through the internal channel CH_INT.

Accordingly, in the case where the first simultaneous transfer mode is entered, the second memory system A30 outputs the data inputted from the first memory system A20 through the internal channel CH_INT, for example, the second data, to the host A10 through the second external channel CH2.

Conversely, in the case where the first sole transfer mode is entered, the first memory system A20 outputs any of the first and second data read-requested from the host A10, for example, the first data, to the host A10 through the first external channel CH1, and then, outputs the remaining data, for example, the second data, to the host A10 through the first external channel CH1.

Moreover, in the case where the second simultaneous transfer mode is entered, the second memory system A30 outputs any of the fourth and fifth data read-requested from the host A10, for example, the fourth data, to the host A10 through the second external channel CH2, and outputs the remaining data, for example, the fifth data, to the first memory system A20 through the internal channel CH_INT.

Accordingly, in the case where the second simultaneous transfer mode is entered, the first memory system A20 outputs the data inputted from the second memory system A30 through the internal channel CH_INT, for example, the fifth data, to the host A10 through the first external channel CH1.

Conversely, in the case where the second sole transfer mode is entered, the second memory system A30 outputs any of the fourth and fifth data read-requested from the host A10, for example, the fourth data, to the host A10 through the second external channel CH2, and then, outputs the remaining data, for example, the fifth data, to the host A10 through the second external channel CH2.

In the case where a read or write request to the second memory system A30 is not scheduled for the preset time or longer from a time of a read request to the first memory system A20, the host A10 enters the first simultaneous transfer mode and thereby selects the simultaneous use of the first and second external channels CH1 and CH2 for the read request to the first memory system A20.

In the case where a read or write request to the first memory system A20 is not scheduled for the preset time or longer from a time of a read request to the second memory system A30, the host A10 enters the second simultaneous transfer mode and thereby selects the simultaneous use of the first and second external channels CH1 and CH2 for the read request to the second memory system A30.

Conversely, in the case where a read or write request to the second memory system A30 is scheduled within the preset time from a time of a read request to the first memory system A20, the host A10 enters the first sole transfer mode and thereby selects the sole use of the first external channel CH1 for the read request to the first memory system A20.

In the case where a read or write request to the first memory system A20 is scheduled within the preset time from a time of a read request to the second memory system A30, the host A10 enters the second sole transfer mode and thereby selects the sole use of the second external channel CH2 for the read request to the second memory system A30.

For reference, in the above descriptions, it is assumed that the host A10 schedules by itself in advance which operation is to be requested to each of the memory systems A20 and A30. For example, the host A10 may schedule in advance whether or not to provide a read or write request to the second memory system A30 within the preset time from a time of a read request to the first memory system A20. Conversely, the host A10 may schedule in advance whether or not to provide a read or write request to the first memory system A20 within the preset time from a time of a read request to the second memory system A30.

The reason why, in the above descriptions, a channel selecting method is divided into two options according to a read request of the host A10 is because coupling schemes between the host A10 and the memory systems A20 and A30 vary. That is, according to the type or operating scheme of the data processing system including the host A10 and the memory systems A20 and A30 or a designer's choice, a host included in a certain data processing system may use the first option in which a channel control information is transferred to memory systems, and a host included in another data processing system may use the second option in which memory systems enter a specific operation mode.

In addition, in the case where, in the above descriptions, the first memory system A20 and the second memory system A30 are in a master-slave relationship with respect to each other, their operations may be limited as follows.

In the case where the first memory system A20 is a master and the second memory system A30 is a slave, an operation of sending data from the first memory system A20 as the master to the second memory system A30 as the slave may be performed, but an opposite operation may not be performed. Namely, in the above descriptions, the operation of selecting the simultaneous use according to the first external channel control information and the operation of entering the first simultaneous transfer mode may be performed, but the operation of selecting the simultaneous use according to the second external channel control information and the operation of entering the second simultaneous transfer mode may not be performed.

Conversely, in the case where the second memory system A30 is a master and the first memory system A20 is a slave, an operation of sending data from the second memory system A30 as the master to the first memory system A20 as the slave may be performed, but an opposite operation may be limited not to be performed. Namely, in the above descriptions, the operation of selecting the simultaneous use according to the second external channel control information and the operation of entering the second simultaneous transfer mode may be performed, but the operation of selecting the simultaneous use according to the first external channel control information and the operation of entering the first simultaneous transfer mode may not be performed.

Of course, in the case where the first memory system A20 and the second memory system A30 are not in a master-slave relationship with respect to each other, an operation of sending data from the first memory system A20 to the second memory system A30 may be performed, and an operation of sending data from the second memory system A30 to the first memory system A20 may be performed as well. Namely, the operation of selecting the simultaneous use according to the first external channel control information, the operation of entering the first simultaneous transfer mode, the operation of selecting the simultaneous use according to the second external channel control information and the operation of entering the second simultaneous transfer mode may be performed.

In the above descriptions, it is illustrated that two memory systems A20 and A30 are included in the data processing system. However, this is nothing but a mere example, and, in practice, it is possible that more memory systems are included. Of course, even in the case where more than two memory systems are included, internal channels for transferring data among the memory systems will be included.

Referring to FIG. 2A, the detailed configuration of the first memory system A20 among the components of the data processing system described above with reference to FIG. 1 is shown.

First, the first memory system A20 includes a memory device which stores data to be accessed from the host A10, that is, the first nonvolatile memory device A21, and a controller B10 which controls data storage to the first nonvolatile memory device A21.

The controller B10 controls the first nonvolatile memory device A21 in response to a request from the host A10. For example, the controller B10 provides data read from the first nonvolatile memory device A21, to the host A10, and stores data provided from the host A10, in the first nonvolatile memory device A21. To this end, the controller 1310 controls the operations of the first nonvolatile memory device A21, such as read, write, program and erase operations.

In detail, the controller B10 included in the first memory system A20 includes a host interface (HOST INTERFACE) 1321, a processor (PROCESSOR) 1341, a memory interface (MEMORY INTERFACE) 1421, a memory (MEMORY) 1441 and an internal channel interface (INTERNAL INTERFACE) B20. All the components 1321, 1341, 1421, 1441 and B20 included in the controller 1310 share signals transferred inside the controller B10, through a first internal bus IN_BUS1.

The host interface 1321 performs an operation of exchanging a request and data transferred between the host A10 and the controller B10.

The memory interface 1421 serves as a memory/storage interface which performs interfacing between the controller 1310 and the first nonvolatile memory device A21, to allow the controller 1310 to control the first nonvolatile memory device A21 in response to a request from the host A10. The memory interface 1421 generates control signals for the first nonvolatile memory device A21 and processes data under the control of the processor 1341, as a NAND flash controller (NFC) in the case where the first nonvolatile memory device A21 is a flash memory, in particular, in the case where the first nonvolatile memory device A21 is a NAND flash memory.

The memory interface 1421 may support the operation of an interface which processes a command and data between the controller B10 and the first nonvolatile memory device A21, for example, a NAND flash interface, in particular, data input/output between the controller B10 and the first nonvolatile memory device A21, and may be driven through a firmware which is referred to as a flash interface layer (FIL), as a region which exchanges data with the first nonvolatile memory device A21.

The internal channel interface B20 is an interface for managing the internal channel CH_INT which exists to couple the first memory system A20 with another memory system of the data processing system having included therein the first memory system A20, for example, the second memory system A30. That is, the internal channel interface B20 performs an operation of inputting and outputting data between the first memory system A20 and the second memory system A30.

For reference, in the case where the first memory system A20 and the second memory system A30 are not a master-slave relationship, the internal channel interface B20 performs both operations of inputting and outputting data between the first memory system A20 and the second memory system A30. However, in the case where the first memory system A20 and the second memory system A30 are a master-slave relationship, the internal channel interface B20 performs only an operation of outputting data from the first memory system A20 to the second memory system A30.

The memory 1441 as the working memory of the first memory system A20 and the controller B10 stores data for driving the first memory system A20 and the controller B10. In detail, the memory 1441 temporarily stores data which should be managed, when the controller B10 controls the first nonvolatile memory device A21 in response to a request from the host A10, for example, when the controller B10 controls the operations of the first nonvolatile memory device A21, such as read, write, program and erase operations.

The memory 1441 may be realized by a volatile memory. For example, the memory 1441 may be realized by a static random access memory (SRAM) or a dynamic random access memory (DRAM).

The memory 1441 may be disposed inside the controller B10 as illustrated in FIG. 2A, and may be disposed outside the controller B10 unlike the illustration of FIG. 2A. In the case where the memory 1441 is disposed outside the controller B10 unlike the illustration of FIG. 2A, the memory 1441 should be realized by an external volatile memory to and from which data are inputted and outputted from and to the controller B10 through a separate memory interface (not shown).

The memory 1441 stores data which should be managed in the course of controlling the operation of the first nonvolatile memory device A21. For such data storage, the memory 1441 may include a program memory, a data memory, a write buffer/cache, a read buffer/cache, a data buffer/cache, a map buffer/cache, and so forth. Thus, a plurality of write data which are inputted from the host A10 may be temporarily stored in the memory 1441 until they are programmed to the first nonvolatile memory device A21.

The processor 1341 controls the entire operations of the first memory system A20, and in particular, controls a program operation or a read operation for the first nonvolatile memory device A21, in response to a write request or a read request from the host A10. The processor 1341 drives a firmware which is referred to as a flash translation layer (FTL), to control general operations of the first memory system A20 for the first nonvolatile memory device A21. The processor 1341 may be realized by a microprocessor or a central processing unit (CPU).

For instance, the controller B10 performs an operation requested from the host A10, in the first nonvolatile memory device A21, that is, performs a command operation corresponding to a request received from the host A10, with the first nonvolatile memory device A21, through the processor 1341 which is realized by a microprocessor or a central processing unit (CPU). The controller B10 may perform a foreground operation as a command operation corresponding to a request received from the host A10, for example, a program operation corresponding to a write request, a read operation corresponding to a read request, an erase operation corresponding to an erase request or a parameter set operation corresponding to a set parameter request or a set feature request as a set request.

The controller B10 may perform a background operation for the first nonvolatile memory device A21, through the processor 1341 which is realized by a microprocessor or a central processing unit (CPU). The background operation for the first nonvolatile memory device A21 may include an operation of copying data stored in a certain memory block among memory blocks MEMORY BLOCK<0, 1, 2, . . . > of the first nonvolatile memory device A21, to another certain memory block, for example, a garbage collection (GC) operation. The background operation for the first nonvolatile memory device A21 may include an operation of swapping stored data among the memory blocks MEMORY BLOCK<0, 1, 2, . . . > of the first nonvolatile memory device A21, for example, a wear leveling (WL) operation. The background operation for the first nonvolatile memory device A21 may include an operation of storing map data stored in the controller B10, in the memory blocks MEMORY BLOCK<0, 1, 2, . . . > of the first nonvolatile memory device A21, for example, a map flush operation. The background operation for the first nonvolatile memory device A21 may include a bad management operation for the first nonvolatile memory device A21, for example, a bad block management operation of checking and processing a bad block among the plurality of memory blocks MEMORY BLOCK<0, 1, 2, . . . > included in the first nonvolatile memory device A21.

The controller B10 may generate and manage log data corresponding to an operation of accessing the memory blocks MEMORY BLOCK<0, 1, 2, . . . > of the first nonvolatile memory device A21, through the processor 1341 which is realized by a microprocessor or a central processing unit (CPU). The operation of accessing the memory blocks MEMORY BLOCK<0, 1, 2, . . . > of the first nonvolatile memory device A21 includes performing a foreground operation or a background operation for the memory blocks MEMORY BLOCK<0, 1, 2, . . . > of the first nonvolatile memory device A21.

In the processor 1341 of the controller B10, a component (not shown) for performing bad block management (which may also be referred to as "bad block manager") of the first nonvolatile memory device A21 may be included. The bad block manager of the first nonvolatile memory device A21 performs a bad block management of checking for a bad block among the plurality of memory blocks MEMORY BLOCK<0, 1, 2, . . . > included in the first nonvolatile memory device A21 and processing the checked bad block as bad. The bad block management means that, in the case where the first nonvolatile memory device A21 is a flash memory, for example, a NAND flash memory, since a program failure may occur when writing data, for example, programming data, due to the characteristic of the NAND flash memory, a memory block where the program failure has occurred is processed as bad and program-failed data is written, that is, programmed, into a new memory block.

The first nonvolatile memory device A21 in the first memory system A20 may retain stored data even though power is not supplied. In particular, the first nonvolatile memory device A21 in the first memory system A20 may store write data (not shown) provided from the host A10, through a write operation, and may provide read data (not shown) stored therein, to the host A10, through a read operation.

While the first nonvolatile memory device A21 may be realized by a nonvolatile memory such as a flash memory, for example, a NAND flash memory, it is to be noted that the first nonvolatile memory device A21 may be realized by any one memory among memories such as a phase change memory (PCRAM: phase change random access memory), a resistive memory (RRAM (ReRAM): resistive random access memory), a ferroelectric memory (FRAM: ferroelectric random access memory) and a spin transfer torque magnetic memory (STT-RAM (STT-MRAM): spin transfer torque magnetic random access memory).

The first nonvolatile memory device A21 includes the plurality of memory blocks MEMORY BLOCK<0, 1, 2, . . . >. That is, the first nonvolatile memory device A21 may store write data provided from the host A10, in the memory blocks MEMORY BLOCK<0, 1, 2, . . . >, through a write operation, and may provide read data (not shown) stored in the memory blocks MEMORY BLOCK<0, 1, 2, . . . >, to the host A10, through a read operation.

Each of the memory blocks MEMORY BLOCK<0, 1, 2, . . . > included in the first nonvolatile memory device A21 includes a plurality of pages P<0, 1, 2, 3, 4, . . . >. Also, while not shown in detail in the drawing, a plurality of memory cells are included in each of the pages P<0, 1, 2, 3, 4, . . . >.

Each of the memory blocks MEMORY BLOCK<0, 1, 2, . . . > included in the first nonvolatile memory device A21 may be classified as a single level cell (SLC) memory block or a multi-level cell (MLC) memory block, depending on the number of bits which may be stored or expressed in one memory cell included therein. An SLC memory block includes a plurality of pages which are realized by memory cells each storing 1 bit, and has excellent data computation performance and high durability. An MLC memory block includes a plurality of pages which are realized by memory cells each storing multi-bit data (for example, 2 or more bits), and may be more highly integrated than the SLC memory block since it has a larger data storage space than the SLC memory block.

In particular, the MLC memory block may be classified as an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data or a multiple level cell memory block including a plurality of pages which are realized by memory cells each capable of storing 5 or more-bit data.

Referring to FIG. 2B, the detailed configuration of the second memory system A30 among the components of the data processing system described above with reference to FIG. 1 is shown.

First, the second memory system A30 includes a memory device which stores data to be accessed from the host A10, that is, the second nonvolatile memory device A31, and a controller B30 which controls data storage to the second nonvolatile memory device A31.

The controller B30 controls the second nonvolatile memory device A31 in response to a request from the host A10. For example, the controller B30 provides data read from the second nonvolatile memory device A31, to the host A10, and stores data provided from the host A10, in the second nonvolatile memory device A31. To this end, the controller B30 controls the operations of the second nonvolatile memory device A31, such as read, write, program, and erase operations.

In detail, the controller B30 included in the second memory system A30 includes a host interface (HOST INTERFACE) 1322, a processor (PROCESSOR) 1342, a memory interface (MEMORY INTERFACE) 1422, a memory (MEMORY) 1442 and an internal channel interface (INTERNAL INTERFACE) B40. All the components 1322, 1342, 1422, 1442 and B40 included in the controller B30 share signals transferred inside the controller B30, through a second internal bus IN_BUS2.

The host interface 1322 performs an operation of exchanging a request and data to be transferred between the second memory system A30 and the host A10.

The memory interface 1422 serves as a memory/storage interface which performs interfacing between the controller B30 and the second nonvolatile memory device A31, to allow the controller B30 to control the second nonvolatile memory device A31 in response to a request from the host A10. The memory interface 1422 generates control signals for the second nonvolatile memory device A31 and processes data under the control of the processor 1342, as a NAND flash controller (NFC) in the case where the second nonvolatile memory device A31 is a flash memory, in particular, in the case where the second nonvolatile memory device A31 is a NAND flash memory.

The memory interface 1422 may support the operation of an interface which processes a command and data between the controller B30 and the second nonvolatile memory device A31, for example, a NAND flash interface, in particular, data input/output between the controller B30 and the second nonvolatile memory device A31, and may be driven through a firmware which is referred to as a flash interface layer (FIL), as a region which exchanges data with the second nonvolatile memory device A31.

The internal channel interface B40 is an interface for managing the internal channel CH_INT which exists to couple the second memory system A30 with another memory system of the data processing system having included therein the second memory system A30, for example, the first memory system A20. That is, the internal channel interface B40 performs an operation of inputting and outputting data between the second memory system A30 and the first memory system A20.

For reference, in the case where the second memory system A30 and the first memory system A20 are not a master-slave relationship, the internal channel interface B40 performs both operations of inputting and outputting data between the second memory system A30 and the first memory system A20. However, in the case where the second memory system A30 and the first memory system A20 are a master-slave relationship, the internal channel interface B40 performs only an operation of outputting data from the second memory system A30 to the first memory system A20.

The memory 1442 as the working memory of the second memory system A30 and the controller B30 stores data for driving the second memory system A30 and the controller 330. In detail, the memory 1442 temporarily stores data which should be managed, when the controller B30 controls the second nonvolatile memory device A31 in response to a request from the host A10, for example, when the controller B30 controls the operations of the second nonvolatile memory device A31, such as read, write, program, and erase operations.

The memory 1442 may be realized by a volatile memory. For example, the memory 1442 may be realized by a static random access memory (SRAM) or a dynamic random access memory (DRAM).

The fact that the memory 1442 is positioned inside the controller B30 as shown in FIG. 2B does not limit the scope of the present disclosure. Namely, it is possible that the memory 1442 is positioned outside the controller B30. In the case where the memory 1442 exists outside the controller B30, the memory 1442 should be realized by an external volatile memory to and from which data are inputted and outputted from and to the controller B30 through a separate memory interface (not shown).

The memory 1442 stores data which should be managed in the course of controlling the operation of the second nonvolatile memory device A31. For such data storage, the memory 1442 may include a program memory, a data memory, a write buffer/cache, a read buffer/cache, a data buffer/cache, a map buffer/cache, and so forth. Thus, a plurality of write data which are inputted from the host A10 may be temporarily stored in the memory 1442 until they are programmed to the second nonvolatile memory device A31.

The processor 1342 controls the entire operations of the second memory system A30, and in particular, controls a program operation or a read operation for the second nonvolatile memory device A31, in response to a write request or a read request from the host A10. The processor 1342 drives a firmware which is referred to as a flash translation layer (FTL), to control general operations of the second memory system A30 for the second nonvolatile memory device A31. The processor 1342 may be realized by a microprocessor or a central processing unit (CPU).

For instance, the controller B30 performs an operation requested from the host A10, in the second nonvolatile memory device A31, that is, performs a command operation corresponding to a request received from the host A10, with the second nonvolatile memory device A31, through the processor 1342 which is realized by a microprocessor or a central processing unit (CPU). The controller B30 may perform a foreground operation as a command operation corresponding to a request received from the host A10, for example, a program operation corresponding to a write request, a read operation corresponding to a read request, an erase operation corresponding to an erase request or a parameter set operation corresponding to a set parameter request or a set feature request as a set request.

The controller B30 may perform a background operation for the second nonvolatile memory device A31, through the processor 1342 which is realized by a microprocessor or a central processing unit (CPU). The background operation for the second nonvolatile memory device A31 may include an operation for copying data stored in a certain memory block among memory blocks MEMORY BLOCK<0, 1, 2, . . . > of the second nonvolatile memory device A31, to another certain memory block, for example, a garbage collection (GC) operation. The background operation for the second nonvolatile memory device A31 may include an operation of swapping stored data among the memory blocks MEMORY BLOCK<0, 1, 2, . . . > of the second nonvolatile memory device A31, for example, a wear leveling (WL) operation. The background operation for the second nonvolatile memory device A31 may include an operation of storing map data stored in the controller B30, in the memory blocks MEMORY BLOCK<0, 1, 2, . . . > of the second nonvolatile memory device A31, for example, a map flush operation. The background operation for the second nonvolatile memory device A31 may include a bad block management operation for the second nonvolatile memory device A31, for example, a bad block management operation of checking and processing a bad block among the plurality of memory blocks MEMORY BLOCK<0, 1, 2, . . . > included in the second nonvolatile memory device A31.

The controller B30 may generate and manage log data corresponding to an operation of accessing the memory blocks MEMORY BLOCK<0, 1, 2, . . . > of the second nonvolatile memory device A31, through the processor 1342 which is realized by a microprocessor or a central processing unit (CPU). The operation of accessing the memory blocks MEMORY BLOCK<0, 1, 2, . . . > the second nonvolatile memory device A31 includes performing a foreground operation or a background operation for the memory blocks MEMORY BLOCK<0, 1, 2, . . . > of the second nonvolatile memory device A31.

In the processor 1342 of the controller B30, an element (not shown) for performing bad block management of the second nonvolatile memory device A31 may be included. The element for performing bad block management of the second nonvolatile memory device A31 performs a bad block management of checking a bad block among the plurality of memory blocks MEMORY BLOCK<0, 1, 2, . . . > included in the second nonvolatile memory device A31 and processing the checked bad block as bad. The bad block management means that, in the case where the second nonvolatile memory device A31 is a flash memory, for example, a NAND flash memory, since a program failure may occur when writing data, for example, programming data, due to the characteristic of the NAND flash memory, a memory block where the program failure has occurred is processed as bad and program-failed data is written, that is, programmed, in a new memory block.

The second nonvolatile memory device A31 in the second memory system A30 may retain stored data even though powers not supplied. In particular, the second nonvolatile memory device A31 in the second memory system A30 may store write data provided from the host A10, through a write operation, and may provide read data (not shown) stored therein, to the host A10, through a read operation.

While the second nonvolatile memory device A31 may be realized by a nonvolatile memory such as a flash memory, for example, a NAND flash memory, it is to be noted that the second nonvolatile memory device A31 may be realized by any one memory among memories such as a phase change memory (PCRAM: phase change random access memory), a resistive memory (RRAM (ReRAM): resistive random access memory), a ferroelectric memory (FRAM: ferroelectric random access memory) and a spin transfer torque magnetic memory (STT-RAM (STT-MRAM): spin transfer torque magnetic random access memory).

The second nonvolatile memory device A31 includes the plurality of memory blocks MEMORY BLOCK<0, 1, 2, . . . >. That is, the second nonvolatile memory device A31 may store write data provided from the host A10, in the memory blocks MEMORY BLOCK<0, 1, 2, . . . >, through a write operation, and may provide read data (not shown) stored in the memory blocks MEMORY BLOCK<0, 1, 2, . . . >, to the host A10, through a read operation.

Each of the memory blocks MEMORY BLOCK<0, 1, 2, . . . > included in the second nonvolatile memory device A31 includes a plurality of pages P<0, 1, 2, 3, 4, . . . >. Also, while not shown in detail in the drawing, a plurality of memory cells are included in each of the pages P<0, 1, 2, 3, 4, . . . >.

Each of the memory blocks MEMORY BLOCK<0, 1, 2, . . . > included in the second nonvolatile memory device A31 may be classified as a single level cell (SLC) memory block or a multi-level cell (MLC) memory block, depending on the number of bits which may be stored or expressed in one memory cell included therein. An SLC memory block includes a plurality of pages which are realized by memory cells each storing 1 bit, and has excellent data computation performance and high durability. An MLC memory block includes a plurality of pages which are realized by memory cells each storing multi-bit data (for example, 2 or more bits), and may be more highly integrated than the SLC memory block since it has a larger data storage space than the SLC memory block.

In particular, the MLC memory block may be classified as an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data or a multiple level cell memory block including a plurality of pages which are realized by memory cells each capable of storing 5 or more-bit data.

FIGS. 3A to 3D are diagrams of examples of operations of the data processing system including a plurality of memory systems in accordance with an embodiment of the present disclosure.

In FIGS. 3A to 3D, the first memory system A20 and the second memory system A30 have a master-slave relationship. Therefore, data may be transferred from the first memory system A20 as a master to the second memory system A30 as a slave, through the internal channel CH_INT. However, data cannot be transferred from the second memory system A30 as a slave to the first memory system A20 as a master.

To this end, the host A10 transfers the first external channel control information CH_INFO1 to the first and second memory systems A20 and A30 to select the sole use of the first external channel CH1 or the simultaneous use of the first and second external channels CH1 and CH2, as will be described below with reference to FIGS. 3A and 3B. Conversely, the host A10 does not use the second external channel control information CH_INFO2 for selecting the sole use of the second external channel CH2 or the simultaneous use of the first and second external channels CH1 and CH2.

Further, the host A10 enters the first sole transfer mode or the first simultaneous transfer mode to select the sole use of the first external channel CH1 or the simultaneous use of the first and second external channels CH1 and CH2, as will be described below with reference to FIGS. 3C and 3D. Conversely, the host A10 does not enter the second sole transfer mode or the second simultaneous transfer mode for selecting the sole use of the second external channel CH2 or the simultaneous use of the first and second external channels CH1 and CH2.

Referring to FIGS. 1 to 3A, when issuing read requests READ_REQ<1:2> for first data DATA1 and second data DATA2 to the first memory system A20, the host A10 transfers the first external channel control information CH_INFO1 for selecting the sole use of the first external channel CH1 or the simultaneous use of the first and second external channels CH1 and CH2, to the first and second memory systems A20 and A30.

The host A10 schedules in advance which operation is to be requested to each of the first and second memory systems A20 and A30. Due to this fact, the host A10 may be aware that it scheduled, after issuing the read requests READ_REQ<1:2> for the first data DATA1 and the second data DATA2 to the first memory system A20, a read request READ_REQ3 for third data DATA3 to be sent to the second memory system A30 within the preset time.

Therefore, when issuing the read requests READ_REQ<1:2> for the first data DATA1 and the second data DATA2 to the first memory system A20, the host A10 transfers the first external channel control information CH_INFO1 for selecting the sole use of the first external channel CH1, to the first and second memory systems A20 and A30.

Accordingly, each of the first and second memory systems A20 and A30 determines in response to the first external channel control information CH_INFO1 that the host A10 has selected the sole use of the first external channel CH1.

Thus, the first memory system A20 reads the first data DATA1 from the first nonvolatile memory device A21 to the first internal bus IN_BUS1 at a first time T1 according to the read request READ_REQ1 from the host A10, and then, outputs the first data DATA1 loaded in the first internal bus IN_BUS1, to the host A10.

In succession, the first memory system A20 reads the second data DATA2 from the first nonvolatile memory device A21 to the first internal bus IN_BUS1 at a second time T2 according to the read request READ_REQ2 from the host A10, and then, outputs the second data DATA2 loaded in the first internal bus IN_BUS1, to the host A10.

After issuing the read requests READ_REQ<1:2> for the first data DATA1 and the second data DATA2 to the first memory system A20, the host A10 issues the read request READ_REQ3 for the third data DATA3 to the second memory system A30 within the preset time.

Because the first memory system A20 is solely using the first external channel CH1 according to the first external channel control information CH_INFO1, the read requests READ_REQ<1:2> to the first memory system A20 and the read request READ_REQ3 to the second memory system A30 may be performed within the preset time.

When solely using the first external channel CH1 according to the first external channel control information CH_INFO1, the first memory system A20 may open the first internal bus IN_BUS1 and the internal channel CH_INT to prevent the data loaded in the first internal bus IN_BUS1 from interfering with the second internal bus IN_BUS2 of the second memory system A30 through the internal channel CH_INT.

Hence, the second memory system A30 reads the third data DATA3 from the second nonvolatile memory device A31 to the second internal bus IN_BUS2 at a third time T3 having a difference within the preset time from the second time T2, according to the read request READ_REQ3 from the host A10, and then, outputs the third data DATA3 loaded in the second internal bus IN_BUS2, to the host A10.

For reference, in the drawing, it may be seen that the third time T3 is a time that is later within the preset time than the second time T2. However, this is nothing but a mere example, and it can be envisaged that the third time T3 is a time that is earlier within the preset time than the first time T1. Namely, since the host A10 may schedule in advance that the difference between the third time T3 and each of the first and second times T1 and T2 is within the preset time, even in the case where the third time T3 is a time that is earlier within the preset time than the first time T1, the host A10 may transfer the first external channel control information CH_INFO1 for selecting the sole use of the first external channel CH1, to the first and second memory systems A20 and A30.

Referring to FIGS. 1 to 2B and 3B, when issuing read requests READ_REQ<1:2> for first data DATA1 and second data DATA2 to the first memory system A20, the host A10 transfers the first external channel control information CH_INFO1 for selecting the sole use of the first external channel CH1 or the simultaneous use of the first and second external channels CH1 and CH2, to the first and second memory systems A20 and A30.

The host A10 schedules in advance which operation is to be requested to each of the first and second memory systems A20 and A30. Due to this fact, the host A10 may be aware that it scheduled, after issuing the read requests READ_REQ<1:2> for the first data DATA1 and the second data DATA2 to the first memory system A20, a read request READ_REQ3 for third data DATA3 to be sent to the second memory system A30 at a time when a time equal to or longer than the preset time has elapsed.

Therefore, when issuing the read requests READ_REQ<1:2> for the first data DATA1 and the second data DATA2 to the first memory system A20, the host A10 transfers the first external channel control information CH_INFO1 for selecting the simultaneous use of the first and second external channels CH1 and CH2, to the first and second memory systems A20 and A30.

Accordingly, each of the first and second memory systems A20 and A30 determines in response to the first external channel control information CH_INFO1 that the host A10 has selected the simultaneous use of the first and second external channels CH1 and CH2.

Thus, the first memory system A20 reads the second data DATA2 from the first nonvolatile memory device A21 to the first internal bus IN_BUS1 at a first time T1 according to the read request READ_REQ1 from the host A10, and then, outputs the second data DATA2 loaded in the first internal bus IN_BUS1, to the second memory system A30 through the internal channel CH_INT.

In succession, the first memory system A20 reads the first data DATA1 from the first nonvolatile memory device A21 to the first internal bus IN_BUS1 at a second time T2 according to the read request READ_REQ2 from the host A10, and then, outputs the first data DATA1 loaded in the first internal bus IN_BUS1, to the host A10.

In this way, the first memory system A20 reads the second data DATA2 to be transferred to the second memory system A30 through the internal channel CH_INT, earlier than the first data DATA1 to be outputted to the host A10 through the first external channel CH1, from the first nonvolatile memory device A21.

After receiving the second data DATA2 inputted from the first memory system A20 through the internal channel CH_INT at the first time T1, to the second internal bus IN_BUS2, the second memory system A30 outputs the second data DATA2 loaded in the second internal bus IN_BUS2, to the host A10 through the second external channel CH2.

Figure 3B:
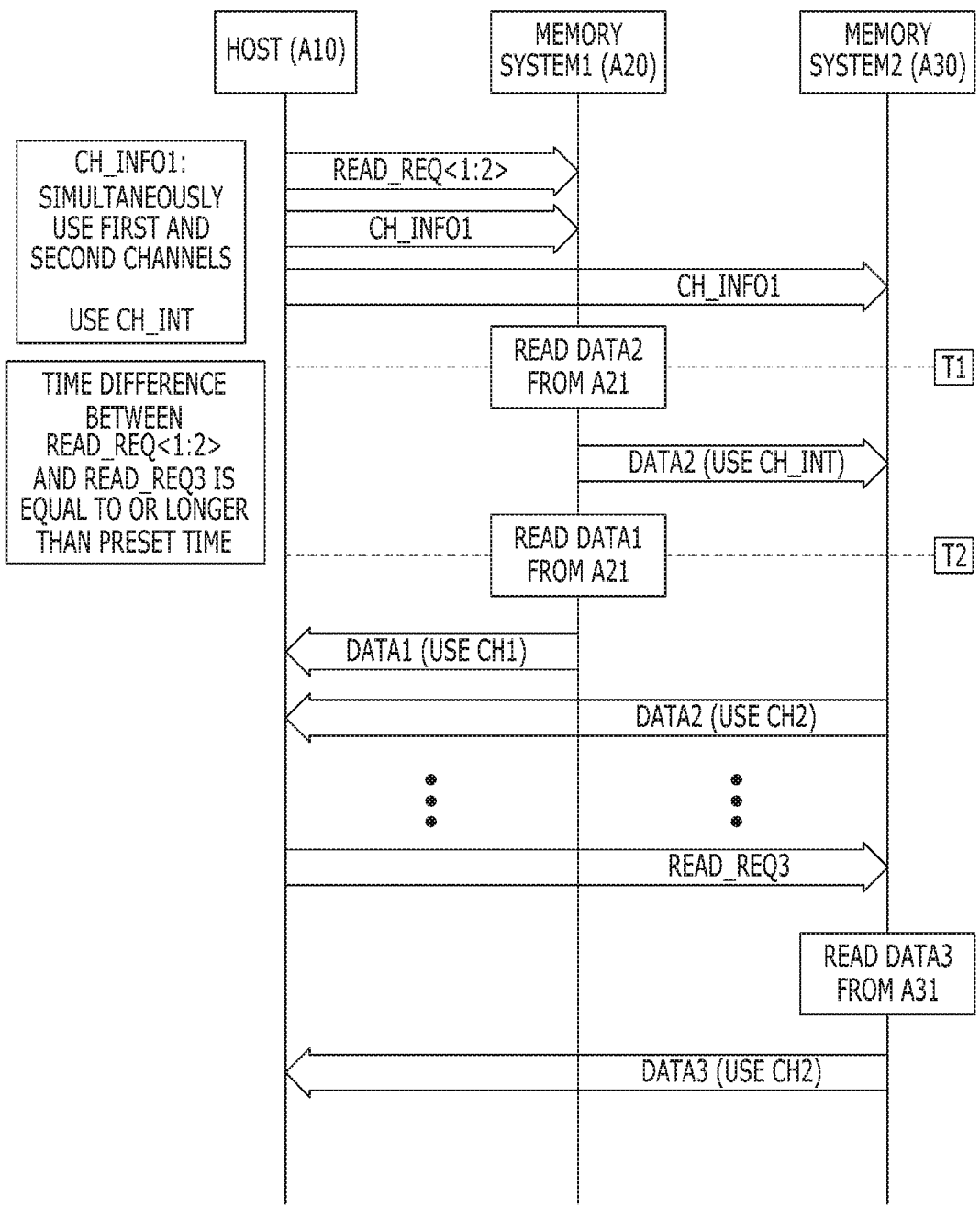
Figure 3C:
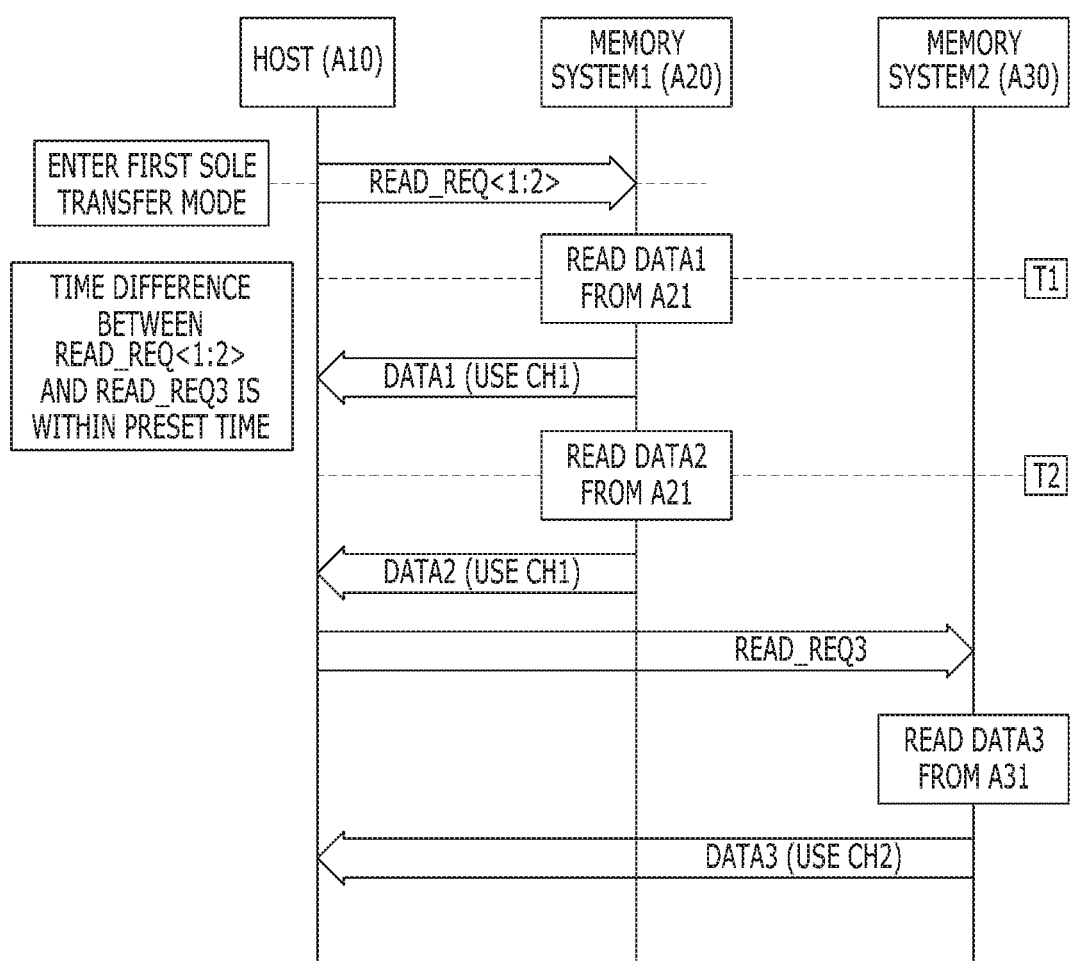

For reference, in FIG. 3B, after the first data DATA1 is outputted to the host A10 through the first external channel CH1 from the first memory system A20, the second data DATA2 is outputted to the host A10 through the second external channel CH2 from the second memory system A30. However, this is only in order not to show the drawing in an overlapping form, and in practice, the first and second data DATA1 and DATA2 are outputted to the host A10 at substantially the same time.

After issuing the read requests READ_REQ<1:2> for the first data DATA1 and the second data DATA2 to the first memory system A20, the host A10 issues the read request READ_REQ3 for the third data DATA3 to the second memory system A30 after a time equal to or longer than the preset time has elapsed.

Since the first memory system A20 is simultaneously using the first and second external channels CH1 and CH2 according to the first external channel control information CH_INFO1, the read requests READ_REQ<1:2> to the first memory system A20 and the read request READ_REQ3 to the second memory system A30 cannot be performed within the preset time.

Hence, the second memory system A30 reads the third data DATA3 from the second nonvolatile memory device A31 to the second internal bus IN_BUS2 at a third time T3 having a difference equal to or longer than the preset time from the second time T2, according to the read request READ_REQ3 from the host A10, and then, outputs the third data DATA3 loaded in the second internal bus IN. BUS2, to the host A10.

For reference, in the drawing, the third time T3 is a time that is later by at least the preset time than the second time T2. However, this is nothing but a mere example, and it can be envisaged that the third time T3 is a time that is earlier by at least the preset time than the first time T1. Since the host A10 may schedule in advance the difference between the third time T3 and each of the first and second times T1 and T2 to be equal to or longer than the preset time, even in the case where the third time T3 is a time that is earlier by at least the preset time than the first time T1, the host A10 may transfer the first external channel control information CH_INFO1 for selecting the simultaneous use of the first and second external channels CH1 and CH2, to the first and second memory systems A20 and A30.

Referring to FIGS. 1 to 2B and 3C, when issuing read requests READ_REQ<1:2> for first data DATA1 and second data DATA2 to the first memory system A20, the host A10 may enter the first sole transfer mode or the first simultaneous transfer mode to select the sole use of the first external channel CH1 or the simultaneous use of the first and second external channels CH1 and CH2.

The host A10 schedules in advance which operation is to be requested to each of the first and second memory systems A20 and A30. Due to this fact, the host A10 may be aware that it scheduled, after issuing the read requests READ_REQ<1:2> for the first data DATA1 and the second data DATA2 to the first memory system A20, a read request READ_REQ3 for third data DATA3 to be sent to the second memory system A30 within the preset time.

Therefore, when issuing the read requests READ_REQ<1:2> for the first data DATA1 and the second data DATA2 to the first memory system A20, the host A10 enters the first sole transfer mode to select the sole use of the first external channel CH1. The host A10 includes an information notifying the entry to the first sole transfer mode, in the read requests READ_REQ<1:2> to be transferred to the first memory system A20, in the form of context.

In the state in which the entry to the first sole transfer mode is made, the first memory system A20 does not transfer data to the second memory system A30 through the internal channel CH_INT. Thus, regardless of whether or not it is a state in which the entry to the first sole transfer mode is made, no influence is exerted on the operation of the second memory system A30. Due to this fact, as shown in FIG. 3C, the first memory system A20 does not transfer the information transferred from the host A10 and notifying that the entry to the first sole transfer mode is made, to the second memory system A30.

The first memory system A20 may be aware that the host A10 has entered the first sole transfer mode, according to the information transferred from the host A10 and notifying that the entry to the first sole transfer mode is made. That is, the first memory system A20 may be aware that the host A10 has selected the sole use of the first external channel CH1.

Thus, the first memory system A20 reads the first data DATA1 from the first nonvolatile memory device A21 to the first internal bus IN_BUS1 at a first time T1 according to the read request READ_REQ1 from the host A10, and then, outputs the first data DATA1 loaded in the first internal bus IN_BUS1, to the host A10.

In succession, the first memory system A20 reads the second data DATA2 from the first nonvolatile memory device A21 to the first internal bus IN_BUS1 at a second time T2 according to the read request READ_REQ2 from the host A10, and then, outputs the second data DATA2 loaded in the first internal bus IN_BUS1, to the host A10.

After issuing the read requests READ_REQ<1:2> for the first data DATA1 and the second data DATA2 to the first memory system A20, the host A10 issues the read request READ_REQ3 for the third data DATA3 to the second memory system A30 within the preset time.

Since the first memory system A20 is solely using the first external channel CH1 according to the entry to the first sole transfer mode, the read requests READ_REQ<1:2> to the first memory system A20 and the read request READ_REQ3 to the second memory system A30 may be performed within the preset time.

When solely using the first external channel CH1 according to the entry to the first sole transfer mode, the first memory system A20 may open the first internal bus IN_BUS1 and the internal channel CH_INT to prevent the data loaded in the first internal bus IN_BUS1 from interfering with the second internal bus IN_BUS2 of the second memory system A30 through the internal channel CH_INT.

Hence, the second memory system A30 reads the third data DATA3 from the second nonvolatile memory device A31 to the second internal bus IN_BUS2 at a third time T3 having a difference within the preset time from the second time T2, according to the read request READ_REQ3 from the host A10, and then, outputs the third data DATA3 loaded in the second internal bus IN_BUS2, to the host A10.

For reference, in the drawing, the third time T3 is a time that is later within the preset time than the second time T2. However, this is nothing but a mere example, and it can be envisaged that the third time T3 is a time that is earlier within the preset time than the first time T1. Namely, since the host A10 may schedule in advance that the difference between the third time T3 and each of the first and second times T1 and T2 is within the preset time, even in the case where the third time T3 is a time that is earlier within the preset time than the first time T1, the host A10 may enter the first sole transfer mode to select the sole use of the first external channel CH1.

Referring to FIGS. 1 to 2B and 3D, when issuing read requests READ_REQ<1:2> for first data DATA1 and second data DATA2 to the first memory system A20, the host A10 may enter the first sole transfer mode or the first simultaneous transfer mode to select the sole use of the first external channel CH1 or the simultaneous use of the first and second external channels CH1 and CH2.

The host A10 schedules in advance which operation is to be requested to each of the first and second memory systems A20 and A30. Due to this fact, the host A10 may be aware that it scheduled, after issuing the read requests READ_REQ<1:2> for the first data DATA1 and the second data DATA2 to the first memory system A20, a read request READ_REQ3 for third data DATA3 to be sent to the second memory system A30 at a time when a time equal to or longer than the preset time has elapsed.

Therefore, when issuing the read requests READ_REQ<1:2> for the first data DATA1 and the second data DATA2 to the first memory system A20, the host A10 enters the first simultaneous transfer mode to select the simultaneous use of the first and second external channels CH1 and CH2. The host A10 includes an information notifying the entry to the first simultaneous transfer mode, in the read requests READ_REQ<1:2> to be transferred to the first memory system A20, in the form of context.

In the state in which the entry to the first simultaneous transfer mode is made, the first memory system A20 transfers data to the second memory system A30 through the internal channel CH_INT. Due to this fact, the second memory system A30 receives data from the first memory system A20 through the internal channel CH_INT in the state in which it enters the first simultaneous transfer mode. As shown in FIG. 3D, the first memory system A20 transfers the information transferred from the host A10 and notifying that the entry to the first simultaneous transfer mode is made, to the second memory system A30 through the internal channel CH_INT.

The first memory system A20 may be aware that the host A10 has entered the first simultaneous transfer mode, according to the information transferred from the host A10 and notifying that the entry to the first simultaneous transfer mode is made. Similarly, the second memory system A30 may be aware that the host A10 has entered the first simultaneous transfer mode, according to the information transferred from the first memory system A20 and notifying that the entry to the first simultaneous transfer mode is made. That is, each of the first and second memory systems A20 and A30 may be aware that the host A10 has selected the simultaneous use of the first and second external channels CH1 and CH2.

Thus, the first memory system A20 reads the second data DATA2 from the first nonvolatile memory device A21 to the first internal bus IN_BUS1 at a first time T1 according to the read request READ_REQ1 from the host A10, and then, outputs the second data DATA2 loaded in the first internal bus IN_BUS1, to the second memory system A30 through the internal channel CH_INT.

In succession, the first memory system A20 reads the first data DATA1 from the first nonvolatile memory device A21 to the first internal bus IN_BUS1 at a second time T2 according to the read request READ_REQ2 from the host A10, and then, outputs the first data DATA1 loaded in the first internal bus IN_BUS1, to the host A10.

In this way, the first memory system A20 reads the second data DATA2 to be transferred to the second memory system A30 through the internal channel CH_INT, earlier than the first data DATA1 to be outputted to the host A10 through the first external channel CH1, from the first nonvolatile memory device A21.

After receiving the second data DATA2 inputted from the first memory system A20 through the internal channel CH_INT at the first time T1, to the second internal bus IN_BUS2, the second memory system A30 outputs the second data DATA2 loaded in the second internal bus IN_BUS2, to the host A10 through the second external channel CH2.

Figure 3D:
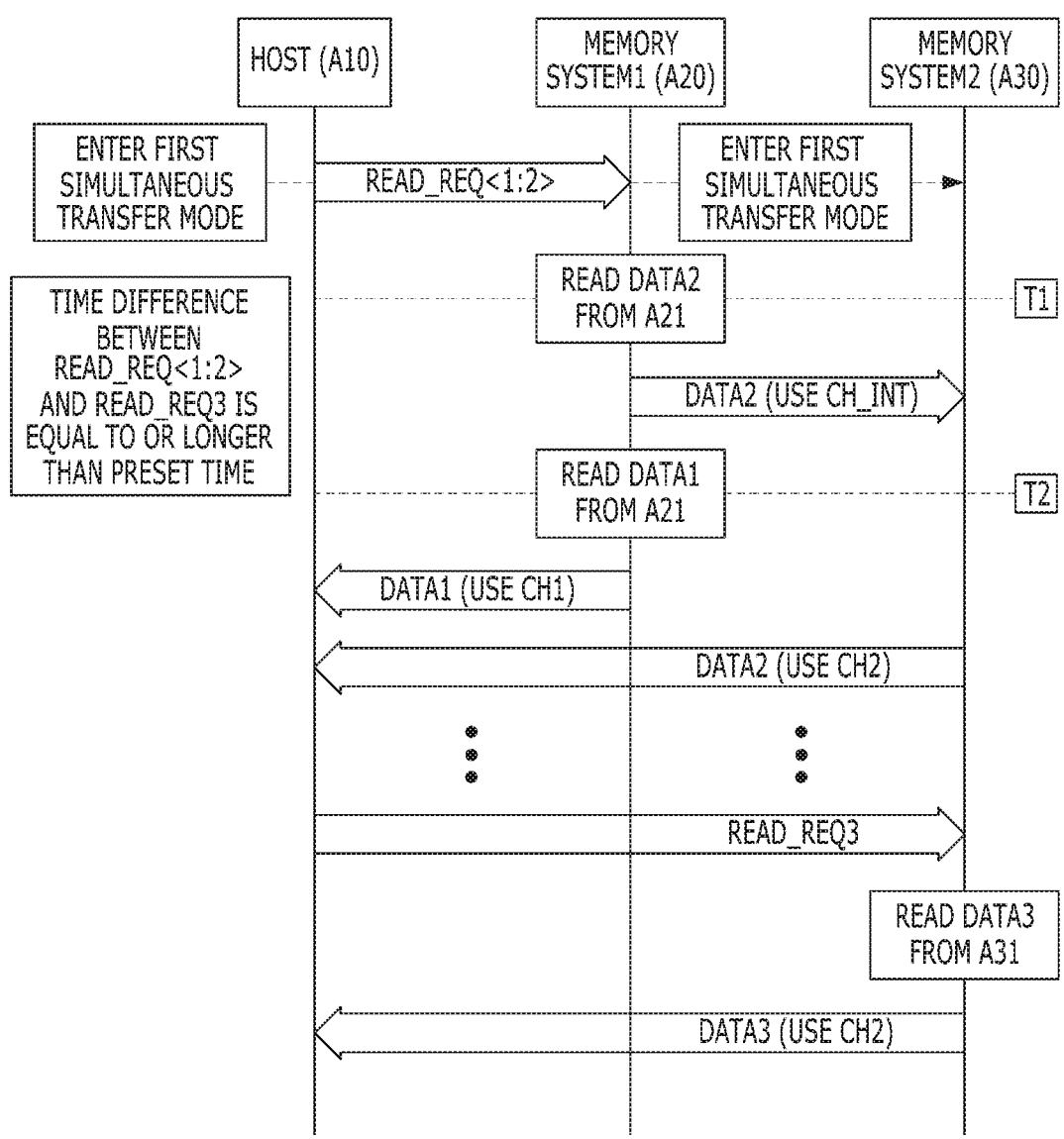

For reference, it may be seen that, in FIG. 3D, after the first data DATA1 is outputted to the host A10 through the first external channel CH1 from the first memory system A20, the second data DATA2 is outputted to the host A10 through the second external channel CH2 from the second memory system A30. However, this is only in order not to show the drawing in an overlapping form, and in practice, the first and second data DATA1 and DATA2 are outputted to the host A10 at substantially the same time.

After issuing the read requests READ_REQ<1:2> for the first data DATA1 and the second data DATA2 to the first memory system A20, the host A10 issues the read request READ_REQ3 for the third data DATA3 to the second memory system A30 after a time equal to or longer than the preset time has elapsed.

Since the first memory system A20 is simultaneously using the first and second external channels CH1 and CH2 according to the entry to the first simultaneous transfer mode, the read requests READ_REQ<1:2> to the first memory system A20 and the read request READ_REQ3 to the second memory system A30 cannot be performed within the preset time.

Hence, the second memory system A30 reads the third data DATA3 from the second nonvolatile memory device A31 to the second internal bus IN_BUS2 at a third time T3 having a difference equal to or longer than the preset time from the second time T2, according to the read request READ_REQ3 from the host A10, and then, outputs the third data DATA3 loaded in the second internal bus IN_BUS2, to the host A10.

For reference, in the drawing, the third time T3 is a time that is later by at least the preset time than the second time T2. However, this is nothing but a mere example, and it can be envisaged that the third time T3 is a time that is earlier by at least the preset time than the first time T1. Namely, since the host A10 may schedule in advance that the difference between the third time T3 and each of the first and second times T1 and T2 is equal to or longer than the preset time, even in the case where the third time T3 is a time that is earlier by at least the preset time than the first time T1, the host A10 may enter the first simultaneous transfer mode to select the simultaneous use of the first and second external channels CH1 and CH2.

Figure 4:
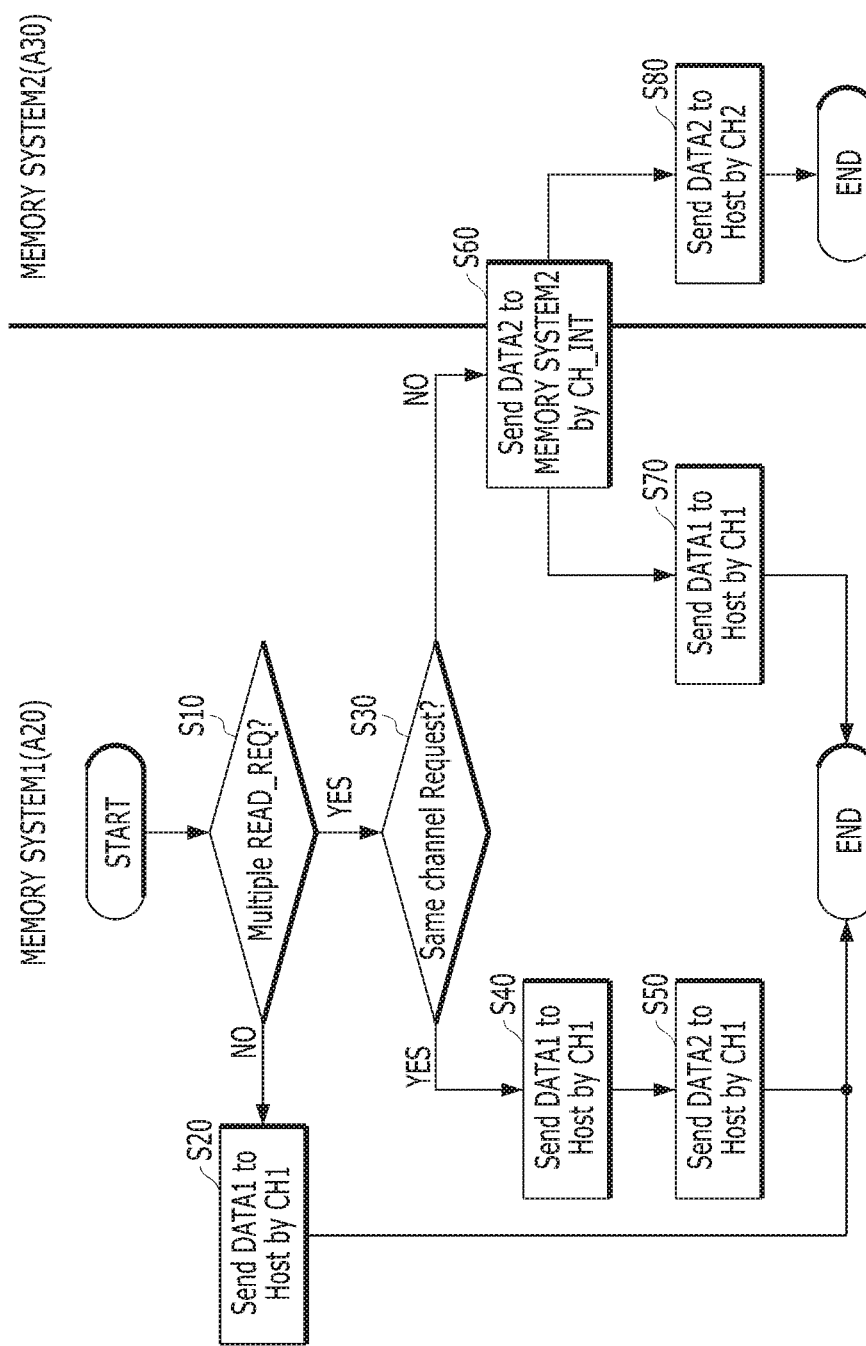
FIG. 4 is a flow chart of an operation of the data processing system including a plurality of memory systems in accordance with an embodiment of the present disclosure.

FIG. 4 is a flow chart of an operation of the data processing system including the plurality of memory systems A20 and A30 in accordance with an embodiment of the present disclosure.

Referring to FIG. 4, as described above with reference to FIGS. 3A to 3D, the first memory system A20 and the second memory system A30 have a master-slave relationship. Therefore, when a read request of the host A10 to the first memory system A20 is sent, an operation of determining whether the read request includes a plurality of successive read requests is performed (S10).

In the case where, as a result of the determination at step S10, the read request of the host A10 to the first memory system A20 is a read request for one data DATA1 (NO at step S10), the first memory system A20 reads the one data DATA1 read-requested from the host A10, to the first internal bus IN_BUS1 from the first nonvolatile memory device A21, and then outputs the data DATA1 loaded in the first internal bus IN_BUS1, to the host A10 through the first external channel CH1 (S20). Thereafter, the process may end.

In the case where, as a result of the determination at step S10, the read request of the host A10 to the first memory system A20 includes a plurality of successive read requests for a plurality of data DATA1 and DATA2 (YES at step S10), the first memory system A20 determines whether the plurality of data DATA1 and DATA2 read-requested by the host A10 should be outputted through only the first external channel CH1 or should be outputted simultaneously through the first and second external channels CH1 and CH2 (S30).

Through the first external channel control information CH_INFO1 transferred separately from the read request from the host A10, it is possible to determine whether the sole use of the first external channel CH1 or the simultaneous use of the first and second external channels CH1 and CH2 is selected as described with reference to FIGS. 3A and 3B.

Also, through an information included in the form of context in the read request from the host A10, it is possible to determine whether the host A10 has entered the first sole transfer mode or the first simultaneous transfer mode as described with reference to FIGS. 3C and 3D.

In the case where, as a result of determination at the step S30, the plurality of data DATA1 and DATA2 read-requested by the host A10 should be outputted through only the first external channel CH1 (YES at step S30), the first memory system A20 reads any one data (e.g., data DATA1) among the plurality of data DATA1 and DATA2 read-requested from the host A10, to the first internal bus IN_BUS1 from the first nonvolatile memory device A21, and then outputs the data DATA1 loaded in the first internal bus IN_BUS1, to the host A10 through the first external channel CH1 (S40).

Then, the first memory system A20 reads the remaining data DATA2 not outputted at the step S40 between the plurality of data DATA1 and DATA2 read-requested from the host A10, to the first internal bus IN_BUS1 from the first nonvolatile memory device A21, and then, outputs the data DATA2 loaded in the first internal bus IN_BUS1, to the host A10 through the first external channel CH1 (S50).

Since the plurality of data DATA1 and DATA2 read-requested from the host A10 are two pieces of data, the plurality of data DATA1 and DATA2 may be sequentially outputted to the host A10 through the two steps S40 and S50. If a plurality of data read-requested from the host A10 is more than two pieces of data, the plurality of data may be sequentially outputted to the host A10 through more than two steps.

In the case where, as a result of the determination at step S30, the plurality of data DATA1 and DATA2 read-requested by the host A10 should be simultaneously outputted through the first and second external channels CH1 and CH2 (NO at step S30), the first memory system A20 reads any (e.g., data DATA2) among the plurality of data DATA1 and DATA2 read-requested from the host A10, to the first internal bus IN_BUS1 from the first nonvolatile memory device A21, and then outputs the data DATA2 loaded in the first internal bus IN_BUS1, to the second memory system A30 through the internal channel CH_INT (S60).

Then, the first memory system A20 reads the remaining data DATA1 not outputted at the step S60 between the plurality of data DATA1 and DATA2 read-requested from the host A10, to the first internal bus IN_BUS1 from the first nonvolatile memory device A21, and then, outputs the data DATA1 loaded in the first internal bus IN_BUS1, to the host A10 through the first external channel CH1 (S70).

Furthermore, in succession to the step S60, the second memory system A30 receives the data DATA2 inputted from the first is memory system A20 through the internal channel CH_INT, to the second internal bus IN_BUS2, and then, outputs the data DATA2 loaded in the second internal bus IN_BUS2, to the host A10 through the second external channel CH2 (580).

FIGS. 5A to 5H are diagrams of examples of operations of the data processing system including a plurality of memory systems in accordance with an embodiment of the present disclosure.

First, in FIGS. 5A to 5H, the first memory system A20 and the second memory system A30 are not a master-slave relationship. Therefore, data may be transferred from the first memory system A20 to the second memory system A30 through the internal channel CH_INT. Also, data may be transferred from the second memory system A30 to the first memory system A20.

To this end, the host A10 transfers the first external channel control information CH_INFO1 to the first and second memory systems A20 and A30 to select the sole use of the first external channel CH1 or the simultaneous use of the first and second external channels CH1 and CH2, as will be described below with reference to FIGS. 5A to 5D. Also, the host A10 transfers the second external channel control information CH_INFO2 for selecting the sole use of the second external channel CH2 or the simultaneous use of the first and second external channels CH1 and CH2, to the first and second memory systems A20 and A30.

Further, the host A10 enters the first sole transfer mode or the first simultaneous transfer mode to select the sole use of the first external channel CH1 or the simultaneous use of the first and second external channels CH1 and CH2, as will be described below with reference to FIGS. 5E to 5H. Also, the host A10 enters the second sole transfer mode or the second simultaneous transfer mode to select the sole use of the second external channel CH2 or the simultaneous use of the first and second external channels CH1 and CH2.

Referring to FIGS. 1 to 2B and 5A, when issuing read requests READ_REQ<4:5> for fourth data DATA4 and fifth data DATA5 to the first memory system A20, the host A10 transfers the first external channel control information CH_INFO1 for selecting the sole use of the first external channel CH1 or the simultaneous use of the first and second external channels CH1 and CH2, to the first and second memory systems A20 and A30. Moreover, when issuing read requests READ_REQ<6:7> for sixth data DATA6 and seventh data DATA7 to the second memory system A30, the host A10 transfers the second external channel control information CH_INFO2 for selecting the sole use of the second external channel CH2 or the simultaneous use of the first and second external channels CH1 and CH2, to the first and second memory systems A20 and A30.

The host A10 schedules in advance which operation is to be requested to each of the first and second memory systems A20 and A30. Due to this fact, the host A10 may be aware that it scheduled, after issuing the read requests READ_REQ<4:5> for the fourth data DATA4 and the fifth data DATA5 to the first memory system A20, the read requests READ_REQ<6:7> for the sixth data DATA6 and the seventh data DATA7 to be sent to the second memory system A30 within the preset time.

Thus, when issuing the read requests READ_REQ<4:5> for the fourth data DATA4 and the fifth data DATA5 to the first memory system A20, the host A10 transfers the first external channel control information CH_INFO1 for allowing the first memory system A20 to select the sole use of the first external channel CH1, to the first and second memory systems A20 and A30. In addition, when issuing the read requests READ_REQ<6:7> for the sixth data DATA6 and the seventh data DATA7 to the second memory system A30, the host A10 transfers the second external channel control information CH_INFO2 for allowing the second memory system A30 to select the sole use of the second external channel CH2, to the first and second memory systems A20 and A30.

Each of the first and second memory systems A20 and A30 determines in response to the first external channel control information CH_INFO1 that the host A10 has selected the sole use of the first external channel CH1 when receiving the data read from the first memory system A20. Similarly, each of the first and second memory systems A20 and A30 determines in response to the second external channel control information CH_INFO2 that the host A10 has selected the sole use of the second external channel CH2 when receiving the data read from the second memory system A30.

Thus, the first memory system A20 reads the fourth data DATA4 from the first nonvolatile memory device A21 to the first internal bus IN_BUS1 at a fourth time T4 according to the read request READ_REQ4 from the host A10, and then, outputs the fourth data DATA4 loaded in the first internal bus IN_BUS1, to the host A10.

In succession, the first memory system A20 reads the fifth data DATA5 from the first nonvolatile memory device A21 to the first internal bus IN_BUS1 at a fifth time T5 according to the read request READ_REQ5 from the host A10, and then, outputs the fifth data DATA5 loaded in the first internal bus IN_BUS1, to the host A10.

After issuing the read requests READ. REQ<4:5> for the fourth data DATA4 and the fifth data DATA5 to the first memory system A20, the host A10 issues the read requests READ_REQ<6:7> for the sixth data DATA6 and the seventh data DATA7 to the second memory system A30 within the preset time.

Since the first memory system A20 is solely using the first external channel CH1 according to the first external channel control information CH_INFO1, no influence is exerted on each of the first memory system A20 and the second memory system A30 when the second memory system A30 solely uses the second external channel CH2 according to the second external channel control information CH_INFO2. Therefore, the read requests READ_REQ<4:5> to the first memory system A20 and the read requests READ_REQ<6:7> to the second memory system A30 may be performed within the preset time.

When solely using the first external channel CH1 according to the first external channel control information CH_INFO1, the first memory system A20 may open the first internal bus IN_BUS1 and the internal channel CH_INT to prevent the data loaded in the first internal bus IN_BUS1 from interfering with the second internal bus IN_BUS2 of the second memory system A30 through the internal channel CH_INT.

Similarly, when solely using the second external channel CH2 according to the second external channel control information CH_INFO2, the second memory system A30 may open the second internal bus IN_BUS2 and the internal channel CH_INT to prevent the data loaded in the second internal bus IN_BUS2 from interfering with the first internal bus IN_BUS1 of the first memory system A20 through the internal channel CH_INT.

Hence, the second memory system A30 reads the sixth data DATA6 from the second nonvolatile memory device A31 to the second internal bus IN_BUS2 at a sixth time T6 having a difference within the preset time from the fifth time T5, according to the read request READ_REQ6 from the host A10, and then, outputs the sixth data DATA6 loaded in the second internal bus IN_BUS2, to the host A10.

In succession, the second memory system A30 reads the seventh data DATA7 from the second nonvolatile memory device A31 to the second internal bus IN_BUS2 at a seventh time T7 according to the read request READ_REQ7 from the host A10, and then, outputs the seventh data DATA7 loaded in the second internal bus IN_BUS2, to the host A10.

For reference, in the drawing, the sixth time T6 is a time that is later within the preset time than the fifth time T5. However, this is nothing but a mere example, and it can be envisaged that the seventh time T7 is a time that is earlier within the preset time than the fourth time T4. Namely, since the host A10 may schedule in advance that the difference between each of the sixth and seventh times T6 and T7 and each of the fourth and fifth times T4 and T5 is within the preset time, even in the case where the seventh time T7 is a time that is earlier within the preset time than the fourth time T4, the host A10 may transfer the first external channel control information CH_INFO1 for allowing the first memory system A20 to select the sole use of the first external channel CH1, to the first and second memory systems A20 and A30, and may transfer the second external channel control information CH_INFO2 for allowing the second memory system A30 to select the sole use of the second external channel CH2, to the first and second memory systems A20 and A30.

Referring to FIGS. 1 to 2B and 5B, when issuing read requests READ_REQ<4:5> for fourth data DATA4 and fifth data DATA5 to the first memory system A20, the host A10 transfers the first external channel control information CH_INFO1 for selecting the sole use of the first external channel CH1 or the simultaneous use of the first and second external channels CH1 and CH2, to the first and second memory systems A20 and A30. Moreover, when issuing read requests READ_REQ<6:7> for sixth data DATA6 and seventh data DATA7 to the second memory system A30, the host A10 transfers the second external channel control information CH_INFO2 for selecting the sole use of the second external channel CH2 or the simultaneous use of the first and second external channels CH1 and CH2, to the first and second memory systems A20 and A30.

The host A10 schedules in advance which operation is to be requested to each of the first and second memory systems A20 and A30. Due to this fact, the host A10 may be aware that it scheduled, after issuing the read requests READ_REQ<4:5> for the fourth data DATA4 and the fifth data DATA5 to the first memory system A20, the read requests READ_REQ<6:7> for the sixth data DATA6 and the seventh data DATA7 to be sent to the second memory system A30 at a time when a time equal to or longer than the preset time has elapsed.

Thus, when issuing the read requests READ_REQ<4:5> for the fourth data DATA4 and the fifth data DATA5 to the first memory system A20, the host A10 transfers the first external channel control information CH_INFO1 for allowing the first memory system A20 to select the simultaneous use of the first and second external channels CH1 and CH2, to the first and second memory systems A20 and A30. In addition, when issuing the read requests READ_REQ<6:7> for the sixth data DATA6 and the seventh data DATA7 to the second memory system A30, the host A10 transfers the second external channel control information CH_INFO2 for allowing the second memory system A30 to select the sole use of the second external channel CH2, to the first and second memory systems A20 and A30.

Each of the first and second memory systems A20 and A30 determines in response to the first external channel control information CH_INFO1 that the host A10 has selected the simultaneous use of the first and second external channels CH1 and CH2 when receiving the data read from the first memory system A20. Each of the first and second memory systems A20 and A30 determines in response to the second external channel control information CH_INFO2 that the host A10 has selected the sole use of the second external channel CH2 when receiving the data read from the second memory system A30.

Thus, the first memory system A20 reads the fifth data DATA5 from the first nonvolatile memory device A21 to the first internal bus IN_BUS1 at a fourth time T4 according to the read request READ_REQ4 from the host A10, and then, outputs the fifth data DATA5 loaded in the first internal bus IN_BUS1, to the second memory system A30 through the internal channel CH_INT.

In succession, the first memory system A20 reads the fourth data DATA4 from the first nonvolatile memory device A21 to the first internal bus IN_BUS1 at a fifth time T5 according to the read request READ_REQ5 from the host A10, and then, outputs the fourth data DATA4 loaded in the first internal bus IN_BUS1, to the host A10.

In this way, the first memory system A20 reads the fifth data DATA5 to be transferred to the second memory system A30 through the internal channel CH_INT, earlier than the fourth data DATA4 to be outputted to the host A10 through the first external channel CH1, from the first nonvolatile memory device A21.

After receiving the fifth data DATA5 inputted from the first memory system A20 through the internal channel CH_INT at the fourth time T4, to the second internal bus IN_BUS2, the second memory system A30 outputs the fifth data DATA5 loaded in the second internal bus IN_BUS2, to the host A10 through the second external channel CH2.

For reference, in FIG. 5B, after the fourth data DATA4 is outputted to the host A10 through the first external channel CH1 from the first memory system A20, the fifth data DATA5 is outputted to the host A10 through the second external channel CH2 from the second memory system A30. However, this is only in order not to show the drawing in an overlapping form, and in practice, the fourth and fifth data DATA4 and DATA5 are outputted to the host A10 at substantially the same time.

After issuing the read requests READ_REQ<4:5> for the fourth data DATA4 and the fifth data DATA5 to the first memory system A20, the host A10 issues the read requests READ_REQ<6:7> for the sixth data DATA6 and the seventh data DATA7 to the second memory system A30 after a time equal to or longer than the preset time has elapsed.

Since the first memory system A20 is simultaneously using the first and second external channels CH1 and CH2 according to the first external channel control information CH_INFO1, when the second memory system A30 solely uses the second external channel CH2 according to the second external channel control information CH_INFO2, an influence may be exerted on each of the first memory system A20 and the second memory system A30. Therefore, the read requests READ_REQ<4:5> to the first memory system A20 and the read requests READ_REQ<6:7> to the second memory system A30 cannot be performed within the preset time.

When solely using the second external channel CH2 according to the second external channel control information CH_INFO2, the second memory system A30 opens the transfer of data from the second internal bus IN_BUS2 to the internal channel CH_INT to prevent the data loaded in the second internal bus IN_BUS2 from interfering with the first internal bus IN_BUS1 of the first memory system A20 through the internal channel CH_INT. However, since the second memory system A30 has to be able to normally receive data from the first memory system A20, the second memory system A30 closes the transfer of data from the internal channel CH_INT to the second internal bus INBUS2.

Hence, the second memory system A30 reads the sixth data DATA6 from the second nonvolatile memory device A31 to the second internal bus IN_BUS2 at a sixth time T6 having a difference equal to or longer than the preset time from the fifth time T5, according to the read request READ_REQ6 from the host A10, and then, outputs the sixth data DATA6 loaded in the second internal bus IN_BUS2, to the host A10.

In succession, the second memory system A30 reads the seventh data DATA7 from the second nonvolatile memory device A31 to the second internal bus IN_BUS2 at a seventh time T7 according to the read request READ_REQ7 from the host A10, and then, outputs the seventh data DATA7 loaded in the second internal bus IN_BUS2, to the host A10.

For reference, in the drawing, the sixth time T6 is a time that is later by at least the preset time than the fifth time T5. However, this is nothing but a mere example, and it can be envisaged that the seventh time T7 is a time that is earlier by at least the preset time than the fourth time T4. Namely, since the host A10 may schedule in advance that the difference between each of the sixth and seventh times T6 and T7 and each of the fourth and fifth times T4 and T5 is equal to or longer than the preset time, even in the case where the seventh time T7 is a time that is earlier by at least the preset time than the fourth time T4, the host A10 may transfer the first external channel control information CH_INFO1 for allowing the first memory system A20 to select the simultaneous use of the first and second external channels CH1 and CH2, to the first and second memory systems A20 and A30, and may transfer the second external channel control information CH_INFO2 for allowing the second memory system A30 to select the sole use of the second external channel CH2, to the first and second memory systems A20 and A30.

Referring to FIGS. 1 to 2B and 5C, when issuing read requests READ_REQ<4:5> for fourth data DATA4 and fifth data DATA5 to the second memory system A30, the host A10 transfers the second external channel control information CH_INFO2 for selecting the sole use of the second external channel CH2 or the simultaneous use of the first and second external channels CH1 and CH2, to the first and second memory systems A20 and A30. Moreover, when issuing read requests READ_REQ<6:7> for sixth data DATA6 and seventh data DATA7 to the first memory system A20, the host A10 transfers the first external channel control information CH_INFO1 for selecting the sole use of the first external channel CH1 or the simultaneous use of the first and second external channels CH1 and CH2, to the first and second memory systems A20 and A30.

The host A10 schedules in advance which operation is to be requested to each of the first and second memory systems A20 and A30. Due to this fact, the host A10 may be aware that it scheduled, after issuing the read requests READ_REQ<4:5> for the fourth data DATA4 and the fifth data DATA5 to the second memory system A30, the read requests READ_REQ<6:7> for the sixth data DATA6 and the seventh data DATA7 to be sent to the first memory system A20 at a time when a time equal to or longer than the preset time has elapsed.

Thus, when issuing the read requests READ_REQ<4:5> for the fourth data DATA4 and the fifth data DATA5 to the second memory system A30, the host A10 transfers the second external channel control information CH_INFO2 for allowing the second memory system A30 to select the simultaneous use of the first and second external channels CH1 and CH2, to the first and second memory systems A20 and A30. In addition, when issuing the read requests READ_REQ<6:7> for the sixth data DATA6 and the seventh data DATA7 to the first memory system A20, the host A10 transfers the first external channel control information CH_INFO1 for allowing the first memory system A20 to select the sole use of the first external channel CH1, to the first and second memory systems A20 and A30.

Each of the first and second memory systems A20 and A30 determines in response to the second external channel control information CH_INFO2, that the host A10 has selected the simultaneous use of the first and second external channels CH1 and CH2 when receiving the data read from the second memory system A30. Each of the first and second memory systems A20 and A30 determines in response to the first external channel control information CH_INFO1, that the host A10 has selected the sole use of the first external channel CH1 when receiving the data read from the first memory system A20.

Thus, the second memory system A30 reads the fifth data DATA5 from the second nonvolatile memory device A31 to the second internal bus IN_BUS2 at a fourth time T4 according to the read request READ_REQ4 from the host A10, and then, outputs the fifth data DATA5 loaded in the second internal bus IN_BUS2, to the first memory system A20 through the internal channel CH_INT.

In succession, the second memory system A30 reads the fourth data DATA4 from the second nonvolatile memory device A31 to the second internal bus IN_BUS2 at a fifth time T5 according to the read request READ_REQ5 from the host A10, and then, outputs the fourth data DATA4 loaded in the second internal bus IN_BUS2, to the host A10.

In this way, the second memory system A30 reads the fifth data DATA5 to be transferred to the first memory system A20 through the internal channel CH_INT, earlier than the fourth data DATA4 to be outputted to the host A10 through the second external channel CH2, from the second nonvolatile memory device A31.

After receiving the fifth data DATA5 inputted from the second memory system A30 through the internal channel CH_INT at the fourth time T4, to the first internal bus IN_BUS1, the first memory system A20 outputs the fifth data DATA5 loaded in the first internal bus IN_BUS1, to the host A10 through the first external channel CH1.

For reference, in FIG. 5C, after the fourth data DATA4 is outputted to the host A10 through the second external channel CH2 from the second memory system A30, the fifth data DATA5 is outputted to the host A10 through the first external channel CH1 from the first memory system A20. However, this is only in order not to show the drawing in an overlapping form, and in practice, the fourth and fifth data DATA4 and DATA5 are outputted to the host A10 at substantially the same time.

After issuing the read requests READ_REQ<4:5> for the fourth data DATA4 and the fifth data DATA5 to the second memory system A30, the host A10 issues the read requests READ_REQ<6:7> for the sixth data DATA6 and the seventh data DATA7 to the first memory system A20 after a time equal to or longer than the preset time has elapsed.

Since the second memory system A30 is simultaneously using the first and second external channels CH1 and CH2 according to the second external channel control information CH_INFO2, when the first memory system A20 solely uses the first external channel CH1 according to the first external channel control information CH_INFO1, an influence may be exerted on each of the first memory system A20 and the second memory system A30. Therefore, the read requests READ_REQ<4:5> to the second memory system A30 and the read requests READ_REQ<6:7> to the first memory system A20 cannot be performed within the preset time.

When solely using the first external channel CH1 according to the first external channel control information CH_INFO1, the first memory system A20 opens the transfer of data from the first internal bus IN_BUS1 to the internal channel CH_INT to prevent the data loaded in the first internal bus IN_BUS1 from interfering with the second internal bus IN_BUS2 of the second memory system A30 through the internal channel CH_INT. However, since the first memory system A20 has to be able to normally receive data from the second memory system A30, the first memory system A20 closes the transfer of data from the internal channel CH_INT to the first internal bus IN_BUS1.

Hence, the first memory system A20 reads the sixth data DATA6 from the first nonvolatile memory device A21 to the first internal bus IN_BUS1 at a sixth time T6 having a difference equal to or longer than the preset time from the fifth time T5, according to the read request READ_REQ6 from the host A10, and then, outputs the sixth data DATA6 loaded in the first internal bus IN_BUS1, to the host A10.

In succession, the first memory system A20 reads the seventh data DATA7 from the first nonvolatile memory device A21 to the first internal bus IN_BUS1 at a seventh time T7 according to the read request READ_REQ7 from the host A10, and then, outputs the seventh data DATA7 loaded in the first internal bus IN_BUS1, to the host A10.

For reference, in the drawing, it may be seen that the sixth time T6 is a time that is later by at least the preset time than the fifth time T5. However, this is nothing but a mere example, and it can be envisaged that the seventh time T7 is a time that is earlier by at least the preset time than the fourth time T4. Namely, since the host A10 may schedule in advance that the difference between each of the sixth and seventh times T6 and T7 and each of the fourth and fifth times T4 and T5 is equal to or longer than the preset time, even in the case where the seventh time T7 is a time that is earlier by at least the preset time than the fourth time T4, the host A10 may transfer the second external channel control information CH_INFO2 for allowing the second memory system A30 to select the simultaneous use of the first and second external channels CH1 and CH2, to the first and second memory systems A20 and A30, and may transfer the first external channel control information CH_INFO1 for allowing the first memory system A20 to select the sole use of the first external channel CH1, to the first and second memory systems A20 and A30.

Referring to FIGS. 1 to 2B and 5D, when issuing read requests READ_REQ<4:5> for fourth data DATA4 and fifth data DATA5 to the first memory system A20, the host A10 transfers the first external channel control information CH_INFO1 for selecting the sole use of the first external channel CH1 or the simultaneous use of the first and second external channels CH1 and CH2, to the first and second memory systems A20 and A30. Moreover, when issuing read requests READ_REQ<6:7> for sixth data DATA6 and seventh data DATA7 to the second memory system A30, the host A10 transfers the second external channel control information CH_INFO2 for selecting the sole use of the second external channel CH2 or the simultaneous use of the first and second external channels CH1 and CH2, to the first and second memory systems A20 and A30.

The host A10 schedules in advance which operation is to be requested to each of the first and second memory systems A20 and A30. Due to this fact, the host A10 may be aware that it scheduled, after issuing the read requests READ_REQ<4:5> for the fourth data DATA4 and the fifth data DATA5 to the first memory system A20, the read requests READ. REQ<6:7> for the sixth data DATA6 and the seventh data DATA7 to be sent to the second memory system A30 at a time when a time equal to or longer than the preset time has elapsed.

Thus, when issuing the read requests READ_REQ<4:5> for the fourth data DATA4 and the fifth data DATA5 to the first memory system A20, the host A10 transfers the first external channel control information CH_INFO1 for allowing the first memory system A20 to select the simultaneous use of the first and second external channels CH1 and CH2, to the first and second memory systems A20 and A30. In addition, when issuing the read requests READ_REQ<6:7> for the sixth data DATA6 and the seventh data DATA7 to the second memory system A30, the host A10 transfers the second external channel control information CH_INFO2 for allowing the second memory system A30 to select the simultaneous use of the first and second external channels CH1 and CH2, to the first and second memory systems A20 and A30.

Each of the first and second memory systems A20 and A30 determines in response to the first external channel control information CH_INFO1 that the host A10 has selected the simultaneous use of the first and second external channels CH1 and CH2 when receiving the data read from the first memory system A20. Each of the first and second memory systems A20 and A30 determines in response to the second external channel control information CH_INFO2 that the host A10 has selected the simultaneous use of the first and second external channels CH1 and CH2 when receiving the data read from the second memory system A30.

Thus, the first memory system A20 reads the fifth data DATA5 from the first nonvolatile memory device A21 to the first internal bus IN_BUS1 at a fourth time T4 according to the read request READ_REQ4 from the host A10, and then, outputs the fifth data DATA5 loaded in the first internal bus IN_BUS1, to the second memory system A30 through the internal channel CH_INT.

In succession, the first memory system A20 reads the fourth data DATA4 from the first nonvolatile memory device A21 to the first internal bus IN_BUS1 at a fifth time T5 according to the read request READ_REQ5 from the host A10, and then, outputs the fourth data DATA4 loaded in the first internal bus IN_BUS1, to the host A10.

In this way, the first memory system A20 reads the fifth data DATA5 to be transferred to the second memory system A30 through the internal channel CH_INT, earlier than the fourth data DATA4 to be outputted to the host A10 through the first external channel CH1, from the first nonvolatile memory device A21.

After receiving the fifth data DATA5 inputted from the first memory system A20 through the internal channel CH_INT at the fourth time T4, to the second internal bus IN_BUS2, the second memory system A30 outputs the fifth data DATA5 loaded in the second internal bus IN_BUS2, to the host A10 through the second external channel CH2.

For reference, in FIG. 5D, after the fourth data DATA4 is outputted to the host A10 through the first external channel CH1 from the first memory system A20, the fifth data DATA5 is outputted to the host A10 through the second external channel CH2 from the second memory system A30. However, this is only in order not to show the drawing in an overlapping form, and in practice, the fourth and fifth data DATA4 and DATA5 are outputted to the host A10 at substantially the same time.

After issuing the read requests READ_REQ<4:5> for the fourth data DATA4 and the fifth data DATA5 to the first memory system A20, the host A10 issues the read requests READ_REQ<6:7> for the sixth data DATA6 and the seventh data DATA7 to the second memory system A30 after a time equal to or longer than the preset time has elapsed.

Since the first memory system A20 is simultaneously using the first and second external channels CH1 and CH2 according to the first external channel control information CH_INFO1, when the second memory system A30 simultaneously uses the first and second external channels CH1 and CH2 according to the second external channel control information CH_INFO2, an influence may be exerted on each of the first memory system A20 and the second memory system A30. Therefore, the read requests READ_REQ<4:5> to the first memory system A20 and the read requests READ_REQ<6:7> to the second memory system A30 cannot be performed within the preset time.

Hence, the second memory system A30 reads the seventh data DATA7 from the second nonvolatile memory device A31 to the second internal bus IN_BUS2 at a sixth time T6 having a difference equal to or longer than the preset time from the fifth time T5, according to the read request READ_REQ6 from the host A10, and then, outputs the seventh data DATA7 loaded in the second internal bus IN_BUS2, to the first memory system A20 through the internal channel CH_INT.

In succession, the second memory system A30 reads the sixth data DATA6 from the second nonvolatile memory device A31 to the second internal bus IN_BUS2 at a seventh time T7 according to the read request READ_REQ7 from the host A10, and then, outputs the sixth data DATA6 loaded in the second internal bus IN_BUS2, to the host A10.

In this way, the second memory system A30 reads the seventh data DATA7 to be transferred to the first memory system A20 through the internal channel CH_INT, earlier than the sixth data DATA6 to be outputted to the host A10 through the second external channel CH2, from the second nonvolatile memory device A31.

After receiving the seventh data DATA7 inputted from the second memory system A30 through the internal channel CH_INT at the sixth time T6, to the first internal bus IN_BUS1, the first memory system A20 outputs the seventh data DATA7 loaded in the first internal bus IN_BUS1, to the host A10 through the first external channel CH1.

For reference, in FIG. 5D, after the sixth data DATA6 is outputted to the host A10 through the second external channel CH2 from the second memory system A30, the seventh data DATA7 is outputted to the host A10 through the first external channel CH1 from the first memory system A20. However, this is only in order not to show the drawing in an overlapping form, and in practice, the sixth and seventh data DATA6 and DATA7 are outputted to the host A10 at substantially the same time.

For reference, in the drawing, the sixth time T6 is a time that is later by at least the preset time than the fifth time T5. However, this is nothing but a mere example, and it can be envisaged that the seventh time T7 is a time that is earlier by at least the preset time than the fourth time T4. Namely, since the host A10 may schedule in advance that the difference between each of the sixth and seventh times T6 and T7 and each of the fourth and fifth times T4 and T5 is equal to or longer than the preset time, even in the case where the seventh time T7 is a time that is earlier by at least the preset time than the fourth time T4, the host A10 may transfer the first external channel control information CH_INFO1 for allowing the first memory system A20 to select the simultaneous use of the first and second external channels CH1 and CH2, to the first and second memory systems A20 and A30, and may transfer the second external channel control information CH_INFO2 for allowing the second memory system A30 to select the simultaneous use of the first and second external channels CH1 and CH2, to the first and second memory systems A20 and A30.

Referring to FIGS. 1 to 2B and 5E, when issuing read requests READ_REQ<4:5> for fourth data DATA4 and fifth data DATA5 to the first memory system A20, the host A10 may enter the first sole transfer mode or the first simultaneous transfer mode to select the sole use of the first external channel CH1 or the simultaneous use of the first and second external channels CH1 and CH2. Moreover, when issuing read requests READ_REQ<6:7> for sixth data DATA6 and seventh data DATA7 to the second memory system A30, the host A10 may enter the second sole transfer mode or the second simultaneous transfer mode to select the sole use of the second external channel CH2 or the simultaneous use of the first and second external channels CH1 and CH2.

The host A10 schedules in advance which operation is to be requested to each of the first and second memory systems A20 and A30. Due to this fact, the host A10 may be aware that it scheduled, after issuing the read requests READ_REQ<4:5> for the fourth data DATA4 and the fifth data DATA5 to the first memory system A20, the read requests READ_REQ<6:7> for the sixth data DATA6 and the seventh data DATA7 to be sent to the second memory system A30 within the preset time.

Therefore, when issuing the read requests READ_REQ<4:5> for the fourth data DATA4 and the fifth data DATA5 to the first memory system A20, the host A10 may enter the first sole transfer mode to allow the first memory system A20 to select the sole use of the first external channel CH1. The host A10 includes an information notifying the entry to the first sole transfer mode, in the read requests READ_REQ<4:5> to be transferred to the first memory system A20, in the form of context. In addition, when issuing the read requests READ_REQ<6:7> for the sixth data DATA6 and the seventh data DATA7 to the second memory system A30, the host A10 may enter the second sole transfer mode to allow the second memory system A30 to select the sole use of the second external channel CH2. The host A10 includes an information notifying the entry to the second sole transfer mode, in the read requests READ_REQ<6:7> to be transferred to the second memory system A30, in the form of context.

Figure 5A:
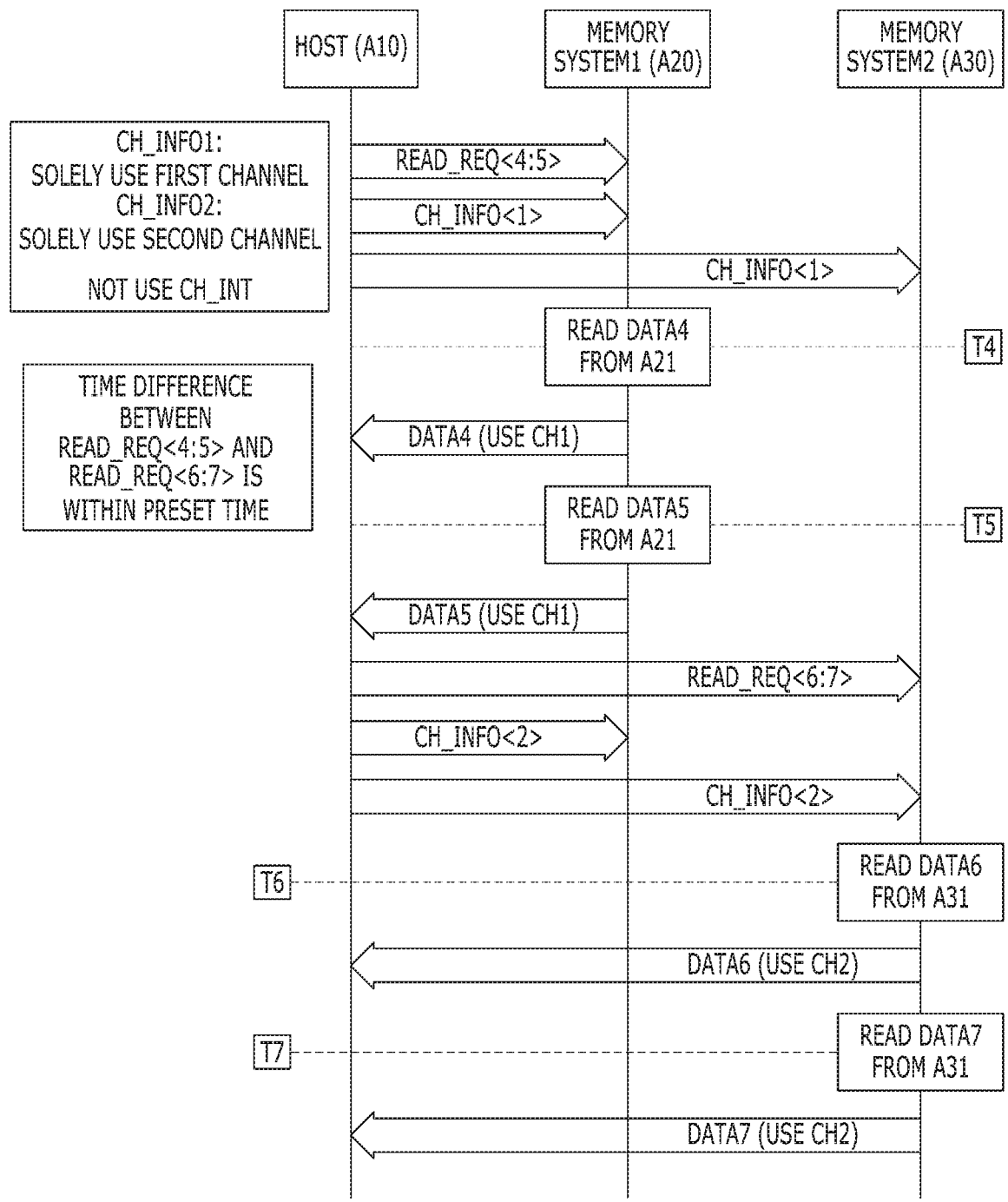
Figure 5E:
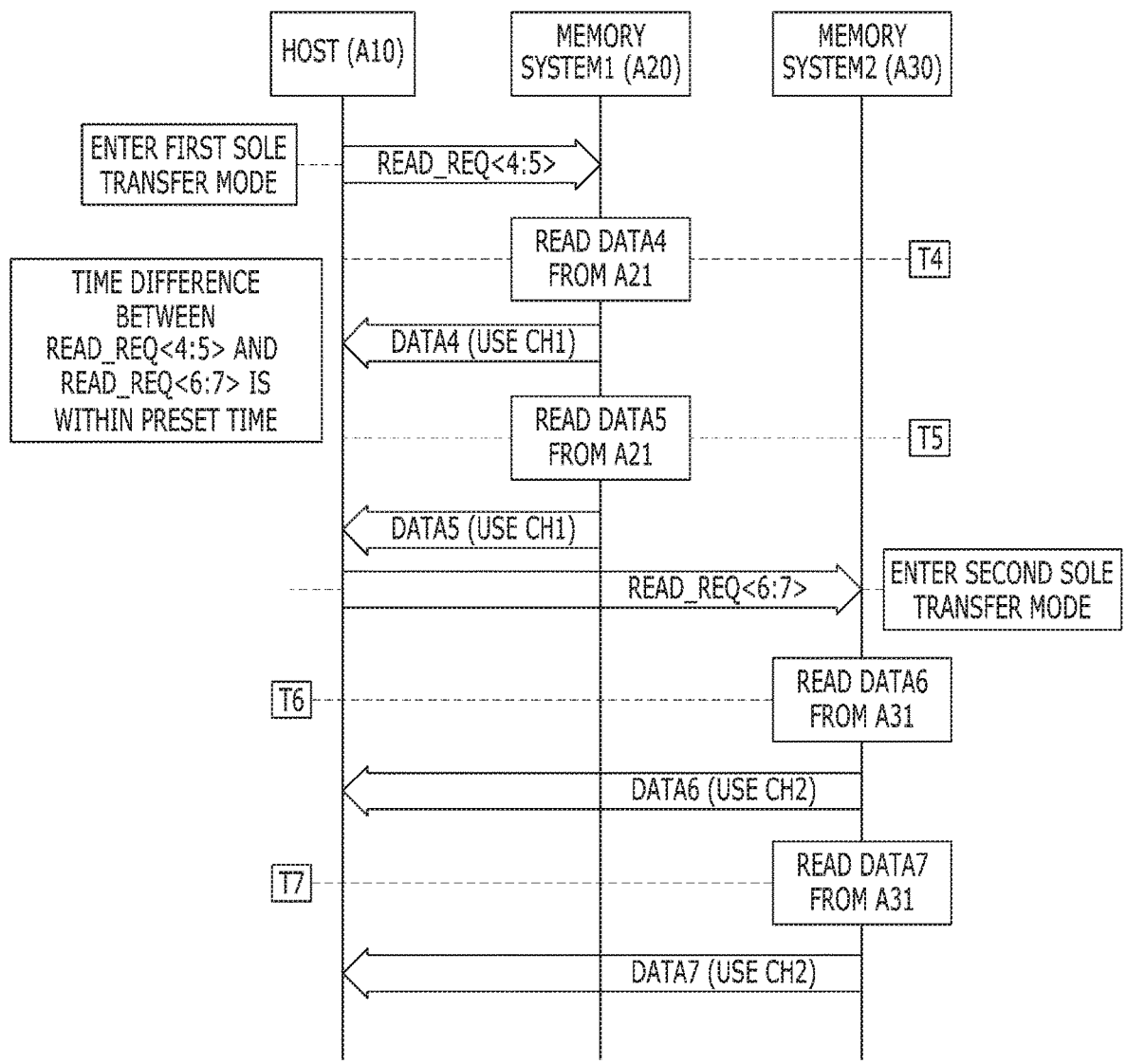

In the state in which the entry to the first sole transfer mode is made, the first memory system A20 does not transfer data to the second memory system A30 through the internal channel CH_INT. Thus, regardless of whether or not it is a state in which the entry to the first sole transfer mode is made, no influence is exerted on the operation of the second memory system A30. Due to this fact, as shown in FIG. 5E, the first memory system A20 does not transfer the information transferred from the host A10 and notifying that the entry to the first sole transfer mode is made, to the second memory system A30.

Similarly, in the state in which the entry to the second sole transfer mode is made, the second memory system A30 does not transfer data to the first memory system A20 through the internal channel CH_INT. Thus, regardless of whether or not it is state in which the entry to the second sole transfer mode is made, no influence is exerted on the operation of the first memory system A20. Due to this fact, as shown in FIG. 5E, the second memory system A30 does not transfer the information transferred from the host A10 and notifying that the entry to the second sole transfer mode is made, to the first memory system A20.

The first memory system A20 may be aware that the host A10 has entered the first sole transfer mode, according to the information transferred from the host A10 and notifying that the entry to the first sole transfer mode is made. That is, the first memory system A20 may be aware that the host A10 has selected the sole use of the first external channel CH1, when transferring the data read from the first memory system A20, to the host A10.

Similarly, the second memory system A30 may be aware that the host A10 has entered the second sole transfer mode, according to the information transferred from the host A10 and notifying that the entry to the second sole transfer mode is made. That is, the second memory system A30 may be aware that the host A10 has selected the sole use of the second external channel CH2, when transferring the data read from the second memory system A30, to the host A10.

Thus, the first memory system A20 reads the fourth data DATA4 from the first nonvolatile memory device A21 to the first internal bus IN_BUS1 at a fourth time T4 according to the read request READ_REQ4 from the host A10, and then, outputs the fourth data DATA4 loaded in the first internal bus IN_BUS1, to the host A10.

In succession, the first memory system A20 reads the fifth data DATA5 from the first nonvolatile memory device A21 to the first internal bus IN_BUS1 at a fifth time T5 according to the read request READ_REQ5 from the host A10, and then, outputs the fifth data DATA5 loaded in the first internal bus IN_BUS1, to the host A10.

After issuing the read requests READ_REQ<4:5> for the fourth data DATA4 and the fifth data DATA5 to the first memory system A20, the host A10 issues the read requests READ_REQ<6:7> for the sixth data DATA6 and the seventh data DATA7 to the second memory system A30 within the preset time.

Due to first memory system A20 is solely using the first external channel CH1 according to the entry to the first sole transfer mode, no influence is exerted on each of the first memory system A20 and the second memory system A30 when the second memory system A30 solely uses the second external channel CH2 according to the entry to the second sole transfer mode. Therefore, the read requests READ_REQ<4:5> to the first memory system A20 and the read requests READ_REQ<6:7> to the second memory system A30 may be performed within the preset time.

When solely using the first external channel CH1 according to the entry to the first sole transfer mode, the first memory system A20 may open the first internal bus IN_BUS1 and the internal channel CH_INT to prevent the data loaded in the first internal bus IN_BUS1 from interfering with the second internal bus IN_BUS2 of the second memory system A30 through the internal channel CH_INT.

Similarly, when solely using the second external channel CH2 according to the entry to the second sole transfer mode, the second memory system A30 may open the second internal bus IN_BUS2 and the internal channel CH_INT to prevent the data loaded in the second internal bus IN_BUS2 from interfering with the first internal bus IN_BUS1 of the first memory system A20 through the internal channel CH_INT.

Hence, the second memory system A30 reads the sixth data DATA6 from the second nonvolatile memory device A31 to the second internal bus IN_BUS2 at a sixth time T6 having a difference within the preset time from the fifth time T5, according to the read request READ_REQ6 from the host A10, and then, outputs the sixth data DATA6 loaded in the second internal bus IN_BUS2, to the host A10.

In succession, the second memory system A30 reads the seventh data DATA7 from the second nonvolatile memory device A31 to the second internal bus IN. BUS2 at a seventh time T7 according to the read request READ_REQ7 from the host A10, and then, outputs the seventh data DATA7 loaded in the second internal bus IN_BUS2, to the host A10.

For reference, in the drawing, the sixth time T6 is a time that is later within the preset time than the fifth time T5. However, this is nothing but a mere example, and it can be envisaged all the way that the seventh time T7 is a time that is earlier within the preset time than the fourth time T4. Namely, since the host A10 may schedule in advance that the difference between each of the sixth and seventh times T6 and T7 and each of the fourth and fifth times T4 and T5 is within the preset time, even in the case where the seventh time T7 is a time that is earlier within the preset time than the fourth time T4, the host A10 may enter the first sole transfer mode to allow the first memory system A20 to select the sole use of the first external channel CH1, and may enter the second sole transfer mode to allow the second memory system A30 to select the sole use of the second external channel CH2.

Referring to FIGS. 1 to 2B and 5F, when issuing read requests READ_REQ<4:5> for fourth data DATA4 and fifth data DATA5 to the first memory system A20, the host A10 may enter the first sole transfer mode or the first simultaneous transfer mode to select the sole use of the first external channel CH1 or the simultaneous use of the first and second external channels CH1 and CH2. Moreover, when issuing read requests READ_REQ<6:7> for sixth data DATA6 and seventh data DATA7 to the second memory system A30, the host A10 may enter the second sole transfer mode or the second simultaneous transfer mode to select the sole use of the second external channel CH2 or the simultaneous use of the first and second external channels CH1 and CH2.

The host A10 schedules in advance which operation is to be requested to each of the first and second memory systems A20 and A30. Due to this fact, the host A10 may be aware that it scheduled, after issuing the read requests READ_REQ<4:5> for the fourth data DATA4 and the fifth data DATA5 to the first memory system A20, the read requests READ_REQ<6:7> for the sixth data DATA6 and the seventh data DATA7 to be sent to the second memory system A30 at a time when a time equal to or longer than the preset time has elapsed.

Thus, when issuing the read requests READ_REQ<4:5> for the fourth data DATA4 and the fifth data DATA5 to the first memory system A20, the host A10 may enter the first simultaneous transfer mode to allow the first memory system A20 to select the simultaneous use of the first and second external channels CH1 and CH2. The host A10 includes an information notifying the entry to the first simultaneous transfer mode, in the read requests READ_REQ<4:5> to be transferred to the first memory system A20, in the form of context. In addition, when issuing the read requests READ_REQ<6:7> for the sixth data DATA6 and the seventh data DATA7 to the second memory system A30, the host A10 may enter the second sole transfer mode to allow the second memory system A30 to select the sole use of the second external channel CH2. The host A10 includes an information notifying the entry to the second sole transfer mode, in the read requests READ_REQ<6:7> to be transferred to the second memory system A30, in the form of context.

Figure 5F:
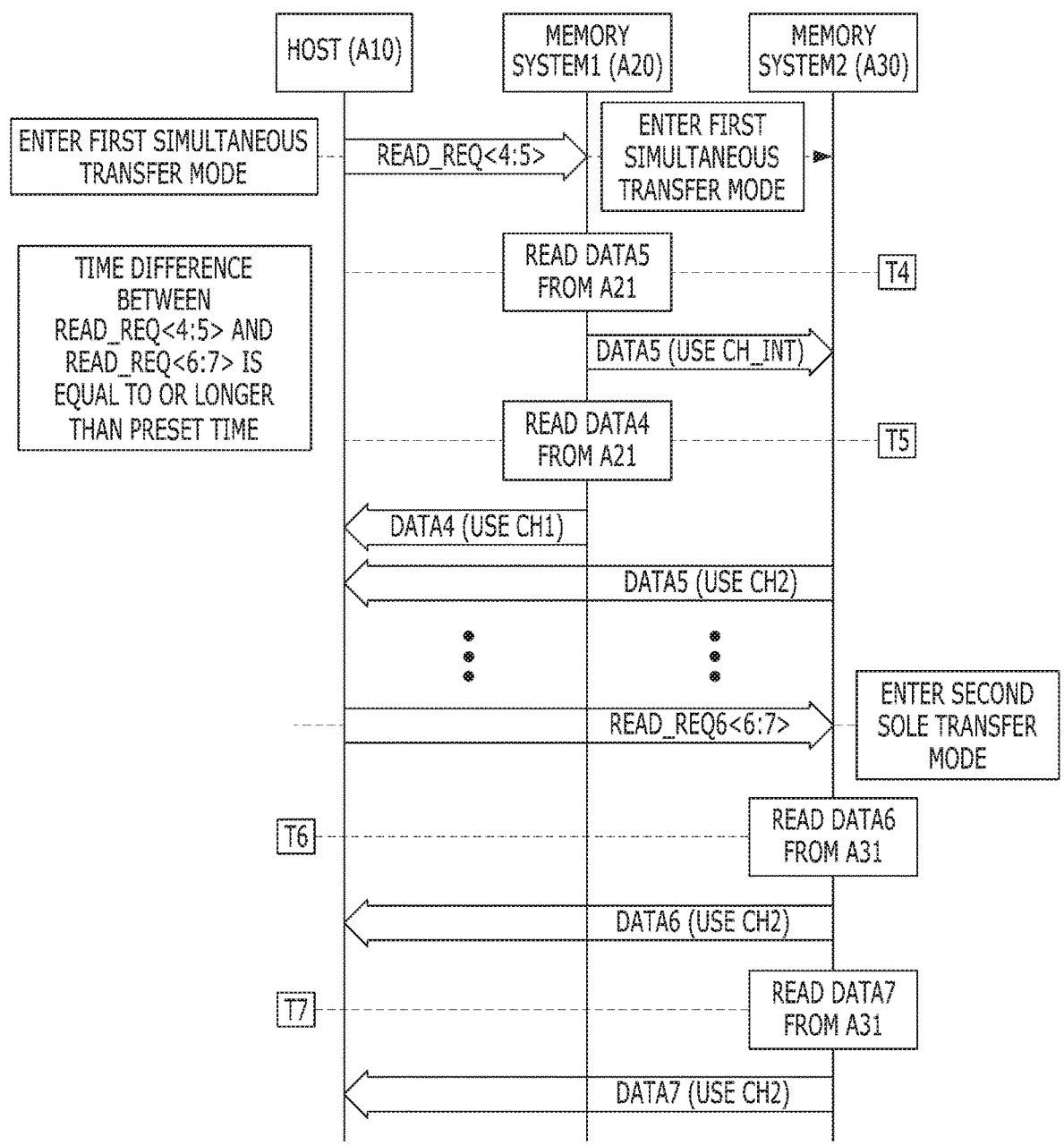

In the state in which the entry to the first simultaneous transfer mode is made, the first memory system A20 transfers data to the second memory system A30 through the internal channel CH_INT. Due to this fact, the second memory system A30 receives data from the first memory system A20 through the internal channel CH_INT in the state in which it enters the first simultaneous transfer mode. As shown in FIG. 5F, the first memory system A20 transfers the information transferred from the host A10 and notifying that the entry to the first simultaneous transfer mode is made, to the second memory system A30 through the internal channel CH_INT.

In the state in which the entry to the second sole transfer mode is made, the second memory system A30 does not transfer data to the first memory system A20 through the internal channel CH_INT. Thus, regardless of whether or not it is a state in which the entry to the second sole transfer mode is made, no influence is exerted on the operation of the first memory system A20. Due to this fact, as shown in FIG. 5F, the second memory system A30 does not transfer the information transferred from the host A10 and notifying that the entry to the second sole transfer mode is made, to the first memory system A20.

The first memory system A20 may be aware that the host A10 has entered the first simultaneous transfer mode, according to the information transferred from the host A10 and notifying that the entry to the first simultaneous transfer mode is made. That is, the first memory system A20 may be aware that the host A10 has selected the simultaneous use of the first and second external channels CH1 and CH2, when transferring the data read from the first memory system A20, to the host A10. The second memory system A30 may be aware that the host A10 has entered the first simultaneous transfer mode, according to the information transferred from the first memory system A20 and notifying that the entry to the first simultaneous transfer mode is made. That is, each of the first and second memory systems A20 and A30 may be aware that the host A10 has selected the simultaneous use of the first and second external channels CH1 and CH2 to receive the data read from the first memory system A20.

Similarly, the second memory system A30 may be aware that the host A10 has entered the second sole transfer mode, according to the information transferred from the host A10 and notifying that the entry to the second sole transfer mode is made. That is, the second memory system A30 may be aware that the host A10 has selected the sole use of the second external channel CH2, when transferring the data read from the second memory system A30, to the host A10.

Thus, the first memory system A20 reads the fifth data DATA5 from the first nonvolatile memory device A21 to the first internal bus IN_BUS1 at a fourth time T4 according to the read request READ_REQ4 from the host A10, and then, outputs the fifth data DATA5 loaded in the first internal bus IN_BUS1, to the second memory system A30 through the internal channel CH_INT.

In succession, the first memory system A20 reads the fourth data DATA4 from the first nonvolatile memory device A21 to the first internal bus IN_BUS1 at a fifth time T5 according to the read request READ_REQ5 from the host A10, and then, outputs the fourth data DATA4 loaded in the first internal bus IN_BUS1, to the host A10.

In this way, the first memory system A20 reads the fifth data DATA5 to be transferred to the second memory system A30 through the internal channel CH_INT, earlier than the fourth data DATA4 to be outputted to the host A10 through the first external channel CH1, from the first nonvolatile memory device A21.

After receiving the fifth data DATA5 inputted from the first memory system A20 through the internal channel CH_INT at the fourth time T4, to the second internal bus IN_BUS2, the second memory system A30 outputs the fifth data DATA5 loaded in the second internal bus IN_BUS2, to the host A10 through the second external channel CH2.

For reference, in FIG. 5F, after the fourth data DATA4 is outputted to the host A10 through the first external channel CH1 from the first memory system A20, the fifth data DATA5 is outputted to the host A10 through the second external channel CH2 from the second memory system A30. However, this is only in order not to show the drawing in an overlapping form, and in practice, the fourth and fifth data DATA4 and DATA5 are outputted to the host A10 at substantially the same time.

After issuing the read requests READ_REQ<4:5> for the fourth data DATA4 and the fifth data DATA5 to the first memory system A20, the host A10 issues the read requests READ_REQ<6:7> for the sixth data DATA6 and the seventh data DATA7 to the second memory system A30 after a time equal to or longer than the preset time has elapsed.

Since the first memory system A20 is simultaneously using the first and second external channels CH1 and CH2 according to the entry to the first simultaneous transfer mode, an influence may be exerted on each of the first memory system A20 and the second memory system A30 when the second memory system A30 solely uses the second external channel CH2 according to the entry to the second sole transfer mode. Therefore, the read requests READ_REQ<4:5> to the first memory system A20 and the read requests READ_REQ<6:7> to the second memory system A30 cannot be performed within the preset time.

When solely using the second external channel CH2 according to the entry to the second sole transfer mode, the second memory system A30 opens the transfer of data from the second internal bus IN_BUS2 to the internal channel CH_INT to prevent the data loaded in the second internal bus IN_BUS2 from interfering with the first internal bus IN_BUS1 of the first memory system A20 through the internal channel CH_INT. However, since the second memory system A30 has to be able to normally receive data from the first memory system A20, the second memory system A30 closes the transfer of data from the internal channel CH_INT to the second internal bus IN_BUS2.

Hence, the second memory system A30 reads the sixth data DATA6 from the second nonvolatile memory device A31 to the second internal bus IN_BUS2 at a sixth time T6 having a difference equal to or longer than the preset time from the fifth time T5, according to the read request READ_REQ6 from the host A10, and then, outputs the sixth data DATA6 loaded in the second internal bus IN_BUS2, to the host A10.

In succession, the second memory system A30 reads the seventh data DATA7 from the second nonvolatile memory device A31 to the second internal bus IN_BUS2 at a seventh time T7 according to the read request READ_REQ7 from the host A10, and then, outputs the seventh data DATA7 loaded in the second internal bus IN_BUS2, to the host A10.

For reference, in the drawing, the sixth time T6 is a time that is later by at least the preset time than the fifth time T5. However, this is nothing but a mere example, and it can be envisaged that the seventh time T7 is a time that is earlier by at least the preset time than the fourth time T4. Namely, since the host A10 may schedule in advance that the difference between each of the sixth and seventh times T6 and T7 and each of the fourth and fifth times T4 and T5 is equal to or longer than the preset time, even in the case where the seventh time T7 is a time that is earlier by at least the preset time than the fourth time T4, the host A10 may enter the first simultaneous transfer mode to allow the first memory system A20 to select the simultaneous use of the first and second external channels CH1 and CH2, and may enter the second sole transfer mode to allow the second memory system A30 to select the sole use of the second external channel CH2.

Referring to FIGS. 1 to 2B and 5G, when issuing read requests READ_REQ<4:5> for fourth data DATA4 and fifth data DATA5 to the second memory system A30, the host A10 may enter the second sole transfer mode or the second simultaneous transfer mode to select the sole use of the second external channel CH2 or the simultaneous use of the first and second external channels CH1 and CH2. Moreover, when issuing read requests READ_REQ<6:7> for sixth data DATA6 and seventh data DATA7 to the first memory system A20, the host A10 may enter the first sole transfer mode or the first simultaneous transfer mode to select the sole use of the first external channel CH1 or the simultaneous use of the first and second external channels CH1 and CH2.

The host A10 schedules in advance which operation is to be requested to each of the first and second memory systems A20 and A30. Due to this fact, the host A10 may be aware that it scheduled, after issuing the read requests READ_REQ<4:5> for the fourth data DATA4 and the fifth data DATA5 to the second memory system A30, the read requests READ_REQ<6:7> for the sixth data DATA6 and the seventh data DATA7 to be sent to the first memory system A20 at a time when a time equal to or longer than the preset time has elapsed.

Thus, when issuing the read requests READ_REQ<4:5> for the fourth data DATA4 and the fifth data DATA5 to the second memory system A30, the host A10 may enter the second simultaneous transfer mode to allow the second memory system A30 to select the simultaneous use of the first and second external channels CH1 and CH2. The host A10 includes an information notifying the entry to the second simultaneous transfer mode, in the read requests READ_REQ<4:5> to be transferred to the second memory system A30, in the form of context. In addition, when issuing the read requests READ_REQ<6:7> for the sixth data DATA6 and the seventh data DATA7 to the first memory system A20, the host A10 may enter the first sole transfer mode to allow the first memory system A20 to select the sole use of the first external channel CH1. The host A10 includes an information notifying the entry to the first sole transfer mode, in the read requests READ_REQ<6:7> to be transferred to the first memory system A20, in the form of context.

Figure 5G:
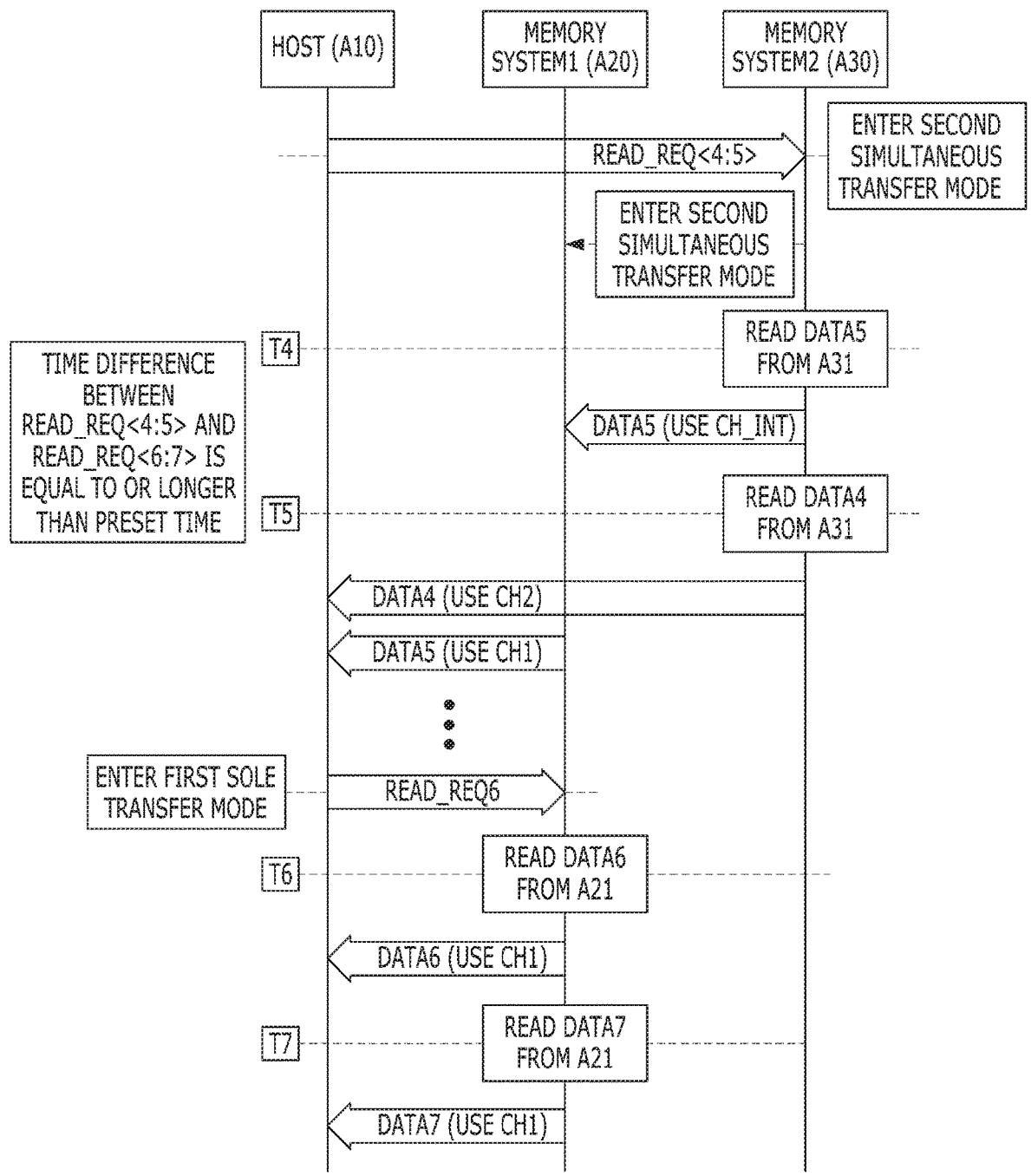

In the state in which the entry to the second simultaneous transfer mode is made, the second memory system A30 transfers data to the first memory system A20 through the internal channel CH_INT. Due to this fact, the first memory system A20 receives data from the second memory system A30 through the internal channel CH_INT in the state in which it enters the second simultaneous transfer mode. As shown in FIG. 5G, the second memory system A30 transfers the information transferred from the host A10 and notifying that the entry to the second simultaneous transfer mode is made, to the first memory system A20 through the internal channel CH_INT.

In the state in which the entry to the first sole transfer mode is made, the first memory system A20 does not transfer data to the second memory system A30 through the internal channel CH_INT. Thus, regardless of whether or not it is a state in which the entry to the first sole transfer mode is made, no influence is exerted on the operation of the second memory system A30. Due to this fact, as shown in FIG. 5G, the first memory system A20 does not transfer the information transferred from the host A10 and notifying that the entry to the first sole transfer mode is made, to the second memory system A30.

The second memory system A30 may be aware that the host A10 has entered the second simultaneous transfer mode, according to the information transferred from the host A10 and notifying that the entry to the second simultaneous transfer mode is made. That is, the second memory system A30 may be aware that the host A10 has selected the simultaneous use of the first and second external channels CH1 and CH2, when transferring the data read from the second memory system A30, to the host A10. The first memory system A20 may be aware that the host A10 has entered the second simultaneous transfer mode, according to the information transferred from the second memory system A30 and notifying that the entry to the second simultaneous transfer mode is made. That is, each of the first and second memory systems A20 and A30 may be aware that the host A10 has selected the simultaneous use of the first and second external channels CH1 and CH2 to receive the data read from the second memory system A30.

Similarly, the first memory system A20 may be aware that the host A10 has entered the first sole transfer mode, according to the information transferred from the host A10 and notifying that the entry to the first sole transfer mode is made. That is, the first memory system A20 may be aware that the host A10 has selected the sole use of the first external channel CH1, when transferring the data read from the first memory system A20, to the host A10.

Thus, the second memory system A30 reads the fifth data DATA5 from the second nonvolatile memory device A31 to the second internal bus IN_BUS2 at a fourth time T4 according to the read request READ_REQ4 from the host A10, and then, outputs the fifth data DATA5 loaded in the second internal bus IN_BUS2, to the first memory system A20 through the internal channel CH_INT.

In succession, the second memory system A30 reads the fourth data DATA4 from the second nonvolatile memory device A31 to the second internal bus IN_BUS2 at a fifth time T5 according to the read request READ-REQ5 from the host A10, and then, outputs the fourth data DATA4 loaded in the second internal bus IN_BUS2, to the host A10.

In this way, the second memory system A30 reads the fifth data DATA5 to be transferred to the first memory system A20 through the internal channel CH_INT, earlier than the fourth data DATA4 to be outputted to the host A10 through the second external channel CH2, from the second nonvolatile memory device A31.

After receiving the fifth data DATA5 inputted from the second memory system A30 through the internal channel CH_INT at the fourth time T4, to the first internal bus IN_BUS1, the first memory system A20 outputs the fifth data DATA5 loaded in the first internal bus IN_BUS1, to the host A10 through the first external channel CH1.

For reference, in FIG. 5G, after the fourth data DATA4 is outputted to the host A10 through the second external channel CH2 from the second memory system A30, the fifth data DATA5 is outputted to the host MO through the first external channel CH1 from the first memory system A20. However, this is only in order not to show the drawing in an overlapping form, and in practice, the fourth and fifth data DATA4 and DATA5 are outputted to the host A10 at substantially the same time.

After issuing the read requests READ_REQ<4:5> for the fourth data DATA4 and the fifth data DATA5 to the second memory system A30, the host A10 issues the read requests READ_REQ<6:7> for the sixth data DATA6 and the seventh data DATA7 to the first memory system A20 after a time equal to or longer than the preset time has elapsed.

Since the second memory system A30 is simultaneously using the first and second external channels CH1 and CH2 according to the entry to the second simultaneous transfer mode, an influence may be exerted on each of the first memory system A20 and the second memory system A30 when the first memory system A20 solely uses the first external channel CH1 according to the entry to the first sole transfer mode. Therefore, the read requests READ_REQ<4:5> to the second memory system A30 and the read requests READ_REQ<6:7> to the first memory system A20 cannot be performed within the preset time.

When solely using the first external channel CH1 according to the entry to the first sole transfer mode, the first memory system A20 opens the transfer of data from the first internal bus IN_BUS1 to the internal channel CH_INT to prevent the data loaded in the first internal bus IN_BUS1 from interfering with the second internal bus IN_BUS2 of the second memory system A30 through the internal channel CH_INT. However, since the first memory system A20 has to be able to normally receive data from the second memory system A30, the first memory system A20 closes the transfer of data from the internal channel CH_INT to the first internal bus INBUS1.

Hence, the first memory system A20 reads the sixth data DATA6 from the first nonvolatile memory device A21 to the first internal bus IN_BUS1 at a sixth time T6 having a difference equal to or longer than the preset time from the fifth time T5, according to the read request READ_REQ6 from the host A10, and then, outputs the sixth data DATA6 loaded in the first internal bus IN_BUS1, to the host A10.

In succession, the first memory system A20 reads the seventh data DATA7 from the first nonvolatile memory device A21 to the first internal bus IN_BUS1 at a seventh time T7 according to the read request READ_REQ7 from the host A10, and then, outputs the seventh data DATA7 loaded in the first internal bus IN_BUS1, to the host A10.

For reference, in the drawing, the sixth time T6 is a time that is later by at least the preset time than the fifth time T5. However, this is nothing but a mere example, and it can be envisaged that the seventh time T7 is a time that is earlier by at least the preset time than the fourth time T4. Namely, since the host A10 may schedule in advance that the difference between each of the sixth and seventh times T6 and T7 and each of the fourth and fifth times T4 and T5 is equal to or longer than the preset time, even in the case where the seventh time T7 is a time that is earlier by at least the preset time than the fourth time T4, the host A10 may enter the second simultaneous transfer mode to allow the second memory system A30 to select the simultaneous use of the first and second external channels CH1 and CH2, and may enter the first sole transfer mode to allow the first memory system A20 to select the sole use of the first external channel CH1.

Referring to FIGS. 1 to 2B and 5H, when issuing read requests READ_REQ<4:5> for fourth data DATA4 and fifth data DATA5 to the first memory system A20, the host A10 may enter the first sole transfer mode or the first simultaneous transfer mode to select the sole use of the first external channel CH1 or the simultaneous use of the first and second external channels CH1 and CH2. Moreover, when issuing read requests READ_REQ<6:7> for sixth data DATA6 and seventh data DATA7 to the second memory system A30, the host A10 may enter the second sole transfer mode or the second simultaneous transfer mode to select the sole use of the second external channel CH2 or the simultaneous use of the first and second external channels CH1 and CH2.

The host A10 schedules in advance which operation is to be requested to each of the first and second memory systems A20 and A30. Due to this fact, the host A10 may be aware that it scheduled, after issuing the read requests READ_REQ<4:5> for the fourth data DATA4 and the fifth data DATA5 to the first memory system A20, the read requests READ_REQ<6:7> for the sixth data DATA6 and the seventh data DATA7 to be sent to the second memory system A30 at a time when a time equal to or longer than the preset time has elapsed.

Thus, when issuing the read requests READ_REQ<4:5> for the fourth data DATA4 and the fifth data DATA5 to the first memory system A20, the host A10 may enter the first simultaneous transfer mode to allow the first memory system A20 to select the simultaneous use of the first and second external channels CH1 and CH2. The host A10 includes an information notifying the entry to the first simultaneous transfer mode, in the read requests READ_REQ<4:5> to be transferred to the first memory system A20, in the form of context. In addition, when issuing the read requests READ_REQ<6:7> for the sixth data DATA6 and the seventh data DATA7 to the second memory system A30, the host A10 may enter the second simultaneous transfer mode to allow the second memory system A30 to select the simultaneous use of the first and second external channels CH1 and CH2. The host A10 includes an information notifying the entry to the second simultaneous transfer mode, in the read requests READ_REQ<6:7> to be transferred to the second memory system A30, in the form of context.

Figure 5H:
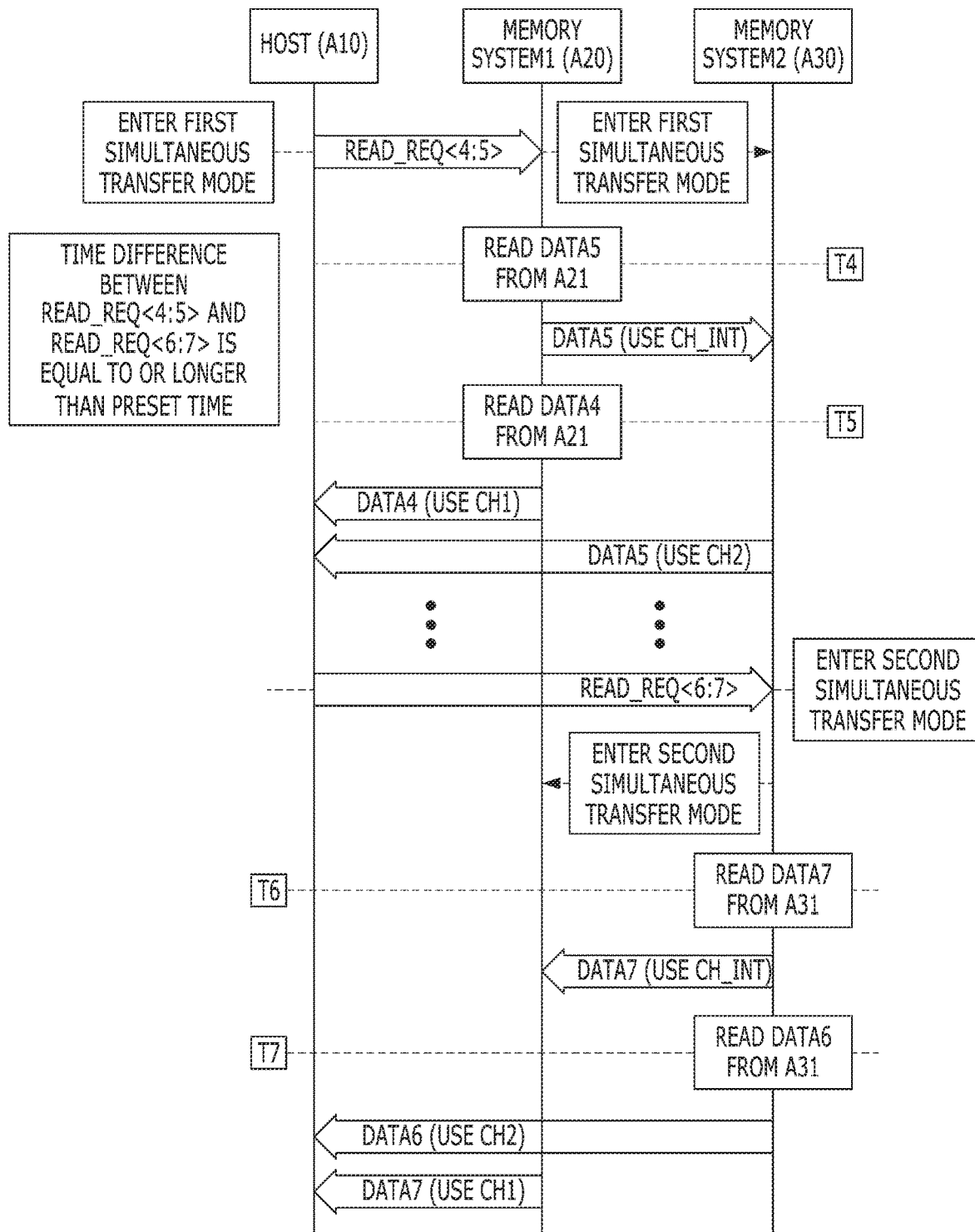

In the state in which the entry to the first simultaneous transfer mode is made, the first memory system A20 transfers data to the second memory system A30 through the internal channel CH_INT. Due to this fact, the second memory system A30 receives data from the first memory system A20 through the internal channel CH_INT in the state in which it enters the first simultaneous transfer mode. As shown in FIG. 5H, the first memory system A20 transfers the information transferred from the host A10 and notifying that the entry to the first simultaneous transfer mode is made, to the second memory system A30 through the internal channel CH_INT.

In the state in which the entry to the second simultaneous transfer mode is made, the second memory system A30 transfers data to the first memory system A20 through the internal channel CH_INT. Due to this fact, the first memory system A20 receives data from the second memory system A30 through the internal channel CH_INT in the state in which it enters the second simultaneous transfer mode. As shown in FIG. 5H, the second memory system A30 transfers the information transferred from the host A10 and notifying that the entry to the second simultaneous transfer mode is made, to the first memory system A20 through the internal channel CH_INT.

The first memory system A20 may be aware that the host A10 has entered the first simultaneous transfer mode, according to the information transferred from the host A10 and notifying that the entry to the first simultaneous transfer mode is made. That is, the first memory system A20 may be aware that the host A10 has selected the simultaneous use of the first and second external channels CH1 and CH2, when transferring the data read from the first memory system A20, to the host A10. The second memory system A30 may be aware that the host A10 has entered the first simultaneous transfer mode, according to the information transferred from the first memory system A20 and notifying that the entry to the first simultaneous transfer mode is made. That is, each of the first and second memory systems A20 and A30 may be aware that the host A10 has selected the simultaneous use of the first and second external channels CH1 and CH2 to receive the data read from the first memory system A20.

Similarly, the second memory system A30 may be aware that the host A10 has entered the second simultaneous transfer mode, according to the information transferred from the host A10 and notifying that the entry to the second simultaneous transfer mode is made. That is, the second memory system A30 may be aware that the host A10 has selected the simultaneous use of the first and second external channels CH1 and CH2, when transferring the data read from the second memory system A30, to the host A10. The first memory system A20 may be aware that the host A10 has entered the second simultaneous transfer mode, according to the information transferred from the second memory system A30 and notifying that the entry to the second simultaneous transfer mode is made. That is, each of the first and second memory systems A20 and A30 may be aware that the host A10 has selected the simultaneous use of the first and second external channels CH1 and CH2 to receive the data read from the second memory system A30.

Thus, the first memory system A20 reads the fifth data DATA5 from the first nonvolatile memory device A21 to the first internal bus IN_BUS1 at a fourth time T4 according to the read request READ_REQ4 from the host A10, and then, outputs the fifth data DATA5 loaded in the first internal bus IN_BUS1, to the second memory system A30 through the internal channel CH_INT.

In succession, the first memory system A20 reads the fourth data DATA4 from the first nonvolatile memory device A21 to the first internal bus IN_BUS1 at a fifth time T5 according to the read request READ_REQ5 from the host A10, and then, outputs the fourth data DATA4 loaded in the first internal bus IN_BUS1, to the host A10.

In this way, the first memory system A20 reads the fifth data DATA5 to be transferred to the second memory system A30 through the internal channel CH_INT, earlier than the fourth data DATA4 to be outputted to the host A10 through the first external channel CH1, from the first nonvolatile memory device A21.

After receiving the fifth data DATA5 inputted from the first memory system A20 through the internal channel CH_INT at the fourth time T4, to the second internal bus IN_BUS2, the second memory system A30 outputs the fifth data DATA5 loaded in the second internal bus IN_BUS2, to the host A10 through the second external channel CH2.

For reference, in FIG. 5H, after the fourth data DATA4 is outputted to the host A10 through the first external channel CH1 from the first memory system A20, the fifth data DATA5 is outputted to the host A10 through the second external channel CH2 from the second memory system A30. However, this is only in order not to show the drawing in an overlapping form, and in practice, the fourth and fifth data DATA4 and DATA5 are outputted to the host A10 at substantially the same time.

After issuing the read requests READ_REQ<4:5> for the fourth data DATA4 and the fifth data DATA5 to the first memory system A20, the host A10 issues the read requests READ_REQ<6:7> for the sixth data DATA6 and the seventh data DATA7 to the second memory system A30 after a time equal to or longer than the preset time has elapsed.

Since the first memory system A20 is simultaneously using the first and second external channels CH1 and CH2 according to the entry to the first simultaneous transfer mode, an influence may be exerted on each of the first memory system A20 and the second memory system A30 when the second memory system A30 simultaneously uses the first and second external channels CH1 and CH2 according to the entry to the second simultaneous transfer mode. Therefore, the read requests READ_REQ<4:5> to the first memory system A20 and the read requests READ_REQ<6:7> to the second memory system A30 cannot be performed within the preset time.

Hence, the second memory system A30 reads the seventh data DATA7 from the second nonvolatile memory device A31 to the second internal bus IN_BUS2 at a sixth time T6 having a difference equal to or longer than the preset time from the fifth time T5, according to the read request READ_REQ6 from the host A10, and then, outputs the seventh data DATA7 loaded in the second internal bus IN_BUS2, to the first memory system A20 through the internal channel CH_INT.

In succession, the second memory system A30 reads the sixth data DATA6 from the second nonvolatile memory device A31 to the second internal bus IN_BUS2 at a seventh time T7 according to the read request READ_REQ7 from the host A10, and then, outputs the sixth data DATA6 loaded in the second internal bus IN_BUS2, to the host A10.

In this way, the second memory system A30 reads the seventh data DATA7 to be transferred to the first memory system A20 through the internal channel CH_INT, earlier than the sixth data DATA6 to be outputted to the host A10 through the second external channel CH2, from the second nonvolatile memory device A31.

After receiving the seventh data DATA7 inputted from the second memory system A30 through the internal channel CH_INT at the sixth time T6, to the first internal bus IN_BUS1, the first memory system A20 outputs the seventh data DATA7 loaded in the first internal bus IN_BUS1, to the host A10 through the first external channel CH1.

For reference, in FIG. 5H, after the sixth data DATA6 is outputted to the host A10 through the second external channel CH2 from the second memory system A30, the seventh data DATA7 is outputted to the host A10 through the first external channel CH1 from the first memory system A20. However, this is only in order not to show the drawing in an overlapping form, and in practice, the sixth and seventh data DATA6 and DATA7 are outputted to the host A10 at substantially the same time.

For reference, in the drawing, the sixth time T6 is a time that is later by at least the preset time than the fifth time T5. However, this is nothing but a mere example, and it can be envisaged that the seventh time T7 is a time that is earlier by at least the preset time than the fourth time T4. Namely, since the host A10 may schedule in advance that the difference between each of the sixth and seventh times T6 and T7 and each of the fourth and fifth times T4 and T5 is equal to or longer than the preset time, even in the case where the seventh time T7 is a time that is earlier by at least the preset time than the fourth time T4, the host A10 may enter the first simultaneous transfer mode to allow the first memory system A20 to select the simultaneous use of the first and second external channels CH1 and CH2, and may enter the second simultaneous transfer mode to allow the second memory system A30 to select the simultaneous use of the first and second external channels CH1 and CH2.

Figure 6A:
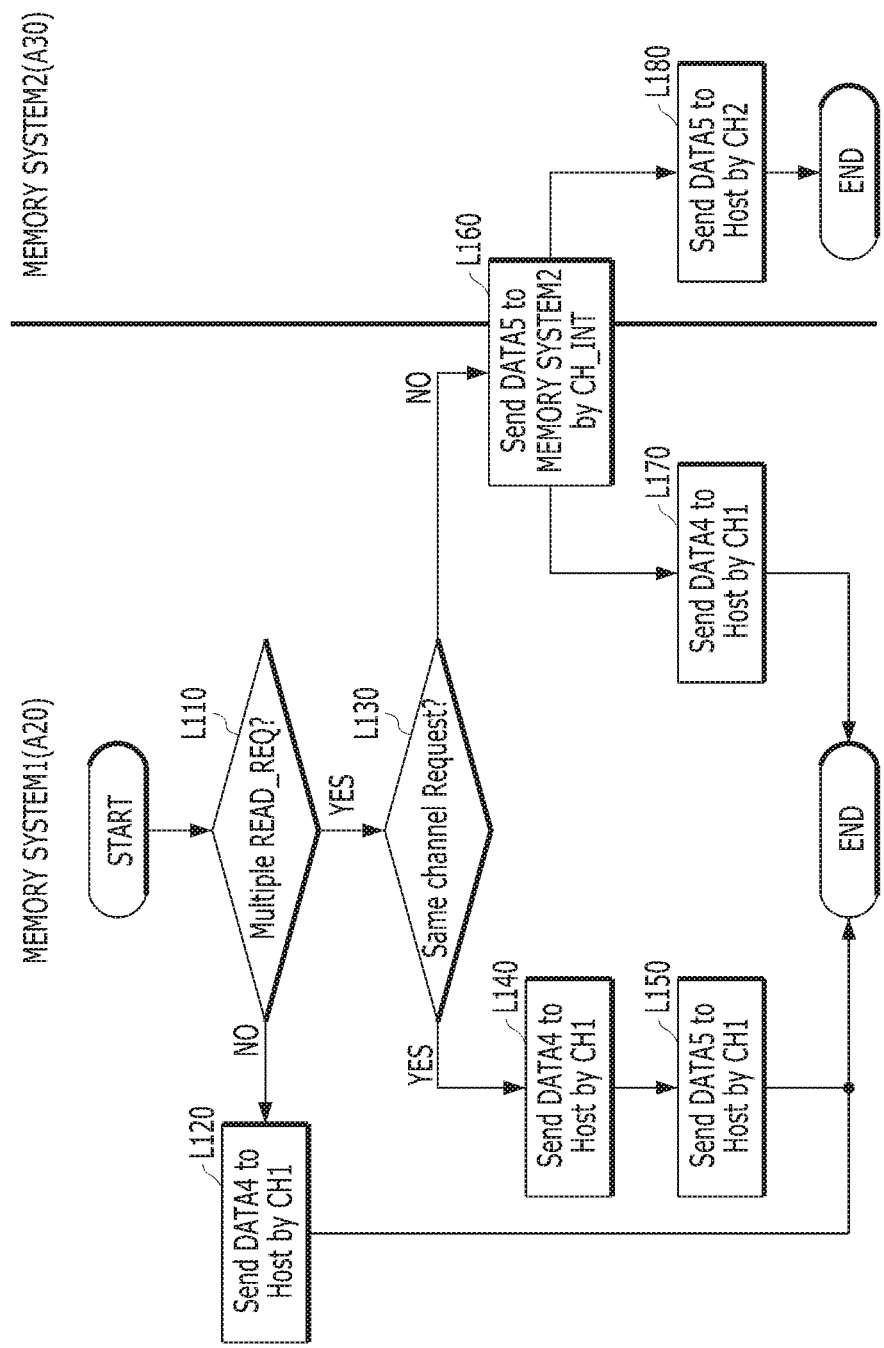
FIGS. 6A and 6B are flow charts of an operation of the data processing system including a plurality of memory systems in accordance with an embodiment of the present disclosure.
Figure 6B:
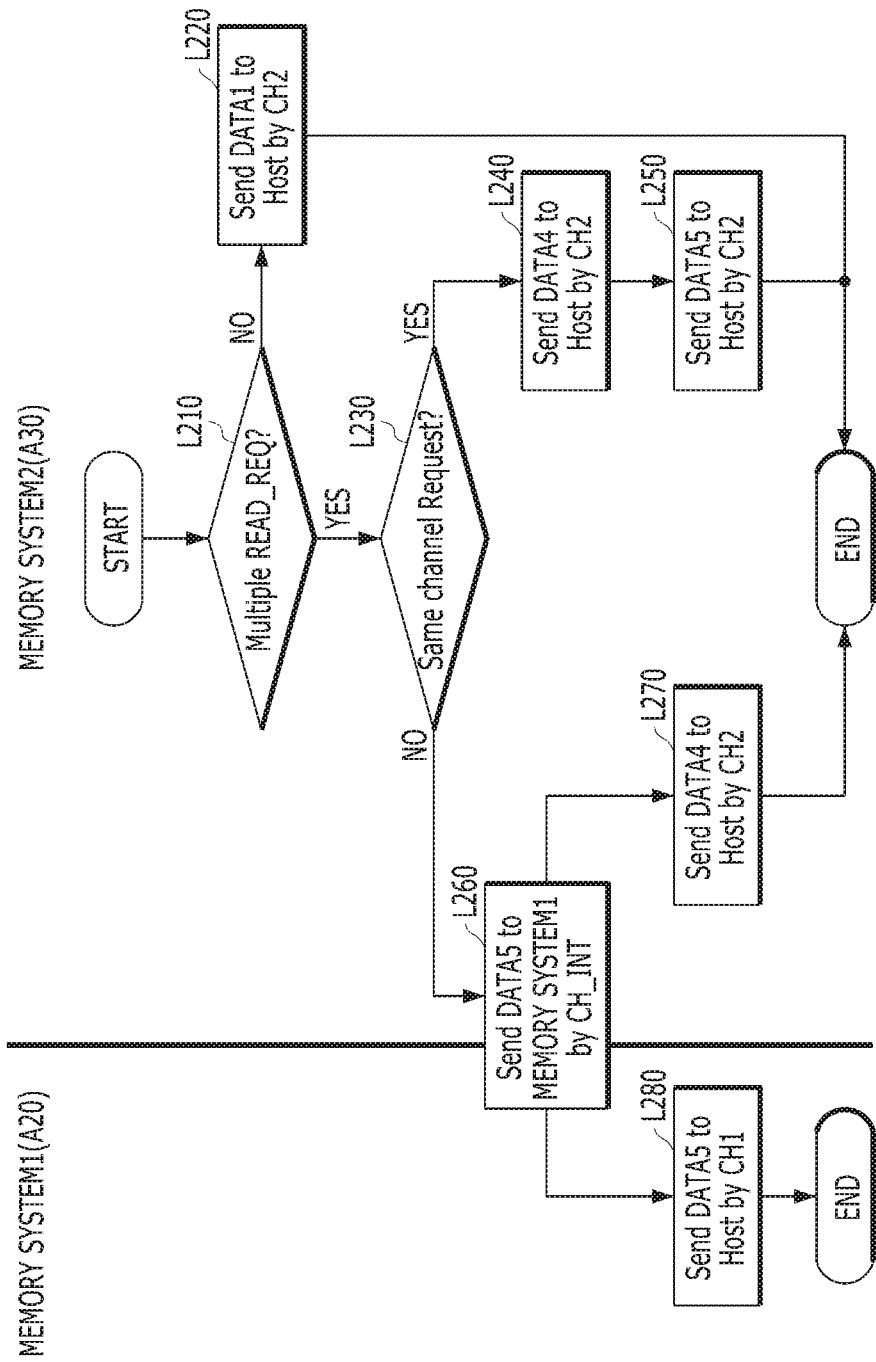

FIGS. 6A and 6B are flow charts of another operation of the data processing system including the plurality of memory systems A20 and A30 in accordance with an embodiment of the present disclosure.

Referring to FIGS. 6A and 6B, as described above with reference to FIGS. 5A to 5H, the first memory system A20 and the second memory system A30 do not have a master-slave relationship.

Therefore, in FIG. 6A, when a read request of the host A10 to the first memory system A20 is sent, an operation of determining whether the read request includes a plurality of successive read requests is performed (L110). Conversely, in FIG. 6B, when a read is request of the host A10 to the second memory system A30 is sent, an operation of determining whether the read request includes a plurality of successive read requests is performed (L210).

Referring to FIG. 6A, in the case where, as a result of the determination at step L110, the read request of the host A10 to the first memory system A20 is a read request for one data DATA4 (NO at step L110), the first memory system A20 reads the one data DATA4 read-requested from the host A10, to the first internal bus IN_BUS1 from the first nonvolatile memory device A21, and then outputs the data DATA4 loaded in the first internal bus IN_BUS1, to the host A10 through the first external channel CH1 (L120). Thereafter, the process may end.

In the case where, as a result of the determination at step L110, the read request of the host A10 to the first memory system A20 includes a plurality of successive read requests for a plurality of data DATA4 and DATA5 (YES at step L110), the first memory system A20 determines whether the plurality of data DATA4 and DATA5 read-requested by the host A10 should be outputted through only the first external channel CH1 or should be outputted simultaneously through the first and second external channels CH1 and CH2 (L130).

By checking the first external channel control information CH_INFO1 transferred separately from the read request from the host A10, it is possible to determine whether the sole use of the first external channel CH1 or the simultaneous use of the first and second external channels CH1 and CH2 is selected as described with reference to FIGS. 5A to 5D.

Also, by checking information included in the form of context in the read request from the host A10, it is possible to determine whether the host A10 has entered the first sole transfer mode or the first simultaneous transfer mode as described with reference to FIGS. 5E to 5H.

In the case where, as a result of the determination at step L130, the plurality of data DATA4 and DATA5 read-requested by the host A10 should be outputted through only the first external channel CH1 (YES at step L130), the first memory system A20 reads any one data (e.g, data DATA4) among the plurality of data DATA4 and DATA5 read-requested from the host A10, to the first internal bus IN_BUS1 from the first nonvolatile memory device A21, and then outputs the data DATA4 loaded in the first internal bus IN_BUS1, to the host A10 through the first external channel CH1 (L140).

Then, the first memory system A20 reads the remaining data DATA5 not outputted at the step L140 between the plurality of data DATA4 and DATA5 read-requested from the host A10, to the first internal bus IN_BUS1 from the first nonvolatile memory device A21, and then, outputs the data DATA5 loaded in the first internal bus IN_BUS1, to the host A10 through the first external channel CH1 (L150).

Since the plurality of data DATA4 and DATA5 read-requested from the host A10 are two pieces of data, the plurality of data DATA4 and DATA5 may be sequentially outputted to the host A10 through the two steps L140 and L150. If a plurality of data read-requested from the host A10 is more than two pieces of data, the plurality of data may be sequentially outputted to the host A10 through more than two steps.

In the case where, as a result of the determination at step L130, the plurality of data DATA4 and DATA5 read-requested by the host A10 should be simultaneously outputted through the first and second external channels CH1 and CH2 (NO at step L130), the first memory system A20 reads any (e.g, data DATA5) among the plurality of data DATA4 and DATA5 read-requested from the host A10, to the first internal bus IN_BUS1 from the first nonvolatile memory device A21, and then outputs the data DATA5 loaded in the first internal bus IN_BUS1, to the second memory system A30 through the internal channel CH_INT (L160).

Then, the first memory system A20 reads the remaining data DATA4 not outputted at the step L160 between the plurality of data DATA4 and DATA5 read-requested from the host A10, to the first internal bus IN_BUS1 from the first nonvolatile memory device A21, and then, outputs the data DATA1 loaded in the first internal bus IN_BUS1, to the host A10 through the first external channel CH1 (L170).

Furthermore, in succession to the step L160, the second memory system A30 receives the data DATA5 inputted from the first memory system A20 through the internal channel CH_INT, to the second internal bus IN_BUS2, and then, outputs the data DATA5 loaded in the second internal bus IN_BUS2, to the host A10 through the second external channel CH2 (L180).

Referring to FIG. 6B, in the case where, as a result of the determination at step L210, the read request of the host A10 to the second memory system A30 is a read request for one data DATA4 (NO at step L210), the second memory system A30 reads the one data DATA4 read-requested from the host A10, to the second internal bus IN_BUS2 from the second nonvolatile memory device A31, and then outputs the data DATA4 loaded in the second internal bus IN_BUS2, to the host A10 through the second external channel CH2 (L220).

In the case where, as a result of the determination at step L210, the read request of the host A10 to the second memory system A30 includes a plurality of successive read requests for a plurality of data DATA4 and DATA5 (YES at step L210), the second memory system A30 determines whether the plurality of data DATA4 and DATA5 read-requested by the host A10 should be outputted through only the second external channel CH2 or should be outputted simultaneously through the first and second external channels CH1 and CH2 (L230).

By checking the second external channel control information CH_INFO2 transferred separately from the read request from the host A10, it is possible to determine whether the sole use of the second external channel CH2 or the simultaneous use of the first and second external channels CH1 and CH2 is selected as described with reference to FIGS. 5A to 5D.

Also, by checking an information included in the form of context in the read request from the host A10, it is possible to determine whether the host A10 has entered the second sole transfer mode or the second simultaneous transfer mode as described with reference to FIGS. 5E to 5H.

In the case where, as a result of the determination at step L230, the plurality of data DATA4 and DATA5 read-requested by the host A10 should be outputted through only the second external channel CH2 (YES at step L230), the second memory system A30 reads any one data (e.g., data DATA4) among the plurality of data DATA4 and DATA5 read-requested from the host A10, to the second internal bus IN_BUS2 from the second nonvolatile memory device A31, and then outputs the data DATA4 loaded in the second internal bus IN_BUS2, to the host A10 through the second external channel CH2 (L240).

Then, the second memory system A30 reads the remaining data DATA5 not outputted at the step L240 between the plurality of data DATA4 and DATA5 read-requested from the host A10, to the second internal bus IN_BUS2 from the second nonvolatile memory device A31, and then, outputs the data DATA5 loaded in the second internal bus IN_BUS2, to the host A10 through the second external channel CH2 (L250).

Since the plurality of data DATA4 and DATA5 read-requested from the host A10 are two pieces of data, the plurality of data DATA4 and DATA5 may be sequentially outputted to the host A10 through the two steps L240 and L250. If a plurality of data read-requested from the host A10 is more than two pieces of data, the plurality of data may be sequentially outputted to the host A10 through more than two steps.

In the case where, as a result of the determination at step L230, the plurality of data DATA4 and DATA5 read-requested by the host A10 should be simultaneously outputted through the first and second external channels CH1 and CH2 (NO at step L230), the second memory system A30 reads any (e.g., data DATA5) among the plurality of data DATA4 and DATA5 read-requested from the host A10, to the second internal bus IN_BUS2 from the second nonvolatile memory device A31, and then outputs the data DATA5 loaded in the second internal bus IN_BUS2, to the first memory system A20 through the internal channel CH_INT (L260).

Then, the second memory system A30 reads the remaining data DATA4 not outputted at the step L260 between the plurality of data DATA4 and DATA5 read-requested from the host A10, to the second internal bus IN_BUS2 from the second nonvolatile memory device A31, and then, outputs the data DATA4 loaded in the second internal bus IN_BUS2, to the host A10 through the second external channel CH2 (L270).

Furthermore, in succession to the step L260, the first memory system A20 receives the data DATA5 inputted from the second memory system A30 through the internal channel CH_INT, to the first internal bus IN_BUS1, and then, outputs the data DATA5 loaded in the first internal bus IN_BUS1, to the host A10 through the first external channel CH1 (L280).

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
   a first memory system including a first nonvolatile memory device and coupled to a host through a first external channel;
   a second memory system including a second nonvolatile memory device and coupled to the host through a second external channel; and
   an internal channel suitable for coupling the first and second memory systems with each other,
   wherein the host, when read-requesting first and second data to the first memory system, transfers a first external channel control information for selecting sole use of the first external channel or simultaneous use of the first and second external channels, to the first and second memory systems,
   wherein the first memory system, when the first external channel control information indicates simultaneous use, outputs the first data to the host through the first external channel and outputs the second data to the second memory system through the internal channel, and
   wherein the second memory system, when the first external channel control information indicates simultaneous use, outputs the second data inputted from the first memory system through the internal channel, to the host through the second external channel.

2. The data processing system according to claim 1, wherein the first memory system,
   when the first external channel control information indicates simultaneous use, reads the second data from the first nonvolatile memory device to a first internal bus at a first time and outputs the second data loaded in the first internal bus, to the second memory system through the internal channel, and reads the first data to the first internal bus at a second time subsequent to the first time and outputs the first data loaded in the first internal bus, to the host through the first external channel, and
   when the first external channel control information indicates simultaneous use, reads the first data from the first nonvolatile memory device to the first internal bus at the first time and outputs the first data loaded in the first internal bus, to the host through the first external channel, and reads the second data to the first internal bus at the second time and outputs the second data loaded in the first internal bus, to the host through the first external channel.

3. The data processing system according to claim 2, wherein the second memory system,
   when the first external channel control information indicates sole use at a third time earlier than the first time or later than the second time, reads third data from the second nonvolatile memory device to a second internal bus and outputs the third data to the host through the second external channel, and
   when the first external channel control information indicates simultaneous use, receives the second data inputted through the internal channel at the first time, to the second internal bus, and outputs the second data to the host through the second external channel.

4. The data processing system according to claim 3, wherein the first memory system, when the first external channel control information indicates sole use, opens the first internal bus and the internal channel.

5. The data processing system according to claim 4, wherein the host,
   when a read or write request to the second memory system is not scheduled for at least a preset time from a time when read-requesting the first and second data to the first memory system, transfers the first external channel control information for selecting simultaneous use of the first and second external channels, to the first and second memory systems.

6. The data processing system according to claim 3, wherein
   the host, when read-requesting fourth and fifth data to the second memory system, transfers a second external channel control information for selecting sole use of the second external channel or simultaneous use of the first and second external channels, to the first and second memory systems,
   the second memory system, when the second external channel control information indicates a simultaneous use, outputs the fourth data to the host through the second external channel, and outputs the fifth data to the first memory system through the internal channel, and
   the first memory system, when the second external channel control information indicates simultaneous use, outputs the fifth data inputted from the second memory system through the internal channel, to the host through the first external channel.

7. The data processing system according to claim 6, wherein the second memory system,
   when the second external channel control information indicates simultaneous use, reads the fifth data from the second nonvolatile memory device to the second internal bus at a fourth time and outputs the fifth data loaded in the second internal bus, to the first memory system through the internal channel, and reads the fourth data at a fifth time subsequent to the fourth time and outputs the fourth data loaded in the second internal bus, to the host through the second external channel,
   when the second external channel control information indicates sole use, reads the fourth data from the second nonvolatile memory device to the second internal bus at the fourth time and outputs the fourth data loaded in the second internal bus, to the host through the second external channel, and reads the fifth data to the second internal bus at the fifth time and outputs the fifth data loaded in the second internal bus, to the host through the second external channel; and
   the first and second times and the fourth and fifth times do not overlap with each other.

8. The data processing system according to claim 7, wherein the first memory system,
   when the second external channel control information indicates sole use at a sixth time earlier than the fourth time or later than the fifth time, reads sixth data from the first nonvolatile memory device to the first internal bus and outputs the sixth data to the host through the first external channel,
   when the second external channel control information indicates simultaneous use, receives the fifth data inputted through the internal channel at the fourth time, to the first internal bus, and outputs the fifth data to the host through the first external channel, and the first to third times and the fourth to sixth times do not overlap with each other.

9. The data processing system according to claim 8, wherein the first memory system, when the first external channel control information indicates sole use, opens transfer of data from the first internal bus to the internal channel, and closes transfer of data from the internal channel to the first internal bus, and the second memory system, when the second external channel control information indicates sole use, opens transfer of data from the second internal bus to the internal channel, and closes transfer of data from the internal channel to the second internal bus.

10. The data processing system according to claim 9, wherein the host, when a read or write request to the second memory system is not scheduled for at least a preset time from a time when read-requesting the first and second data to the first memory system, transfers the first external channel control information for selecting simultaneous use of the first and second external channels, to the first and second memory systems, and when a read or write request to the first memory system is not scheduled for at least the preset time from a time when read-requesting the fourth and fifth data to the second memory system, transfers the second external channel control information for selecting simultaneous use of the first and second external channels, to the first and second memory systems.

11. A data processing system comprising:

a first memory system including a first nonvolatile memory device and coupled to a host through a first external channel;

a second memory system including a second nonvolatile memory device and coupled to the host through a second external channel; and an internal channel suitable for coupling the first and second memory systems with each other, wherein the first memory system, when receiving read requests for first and second data from the host, outputs the first data to the host through the first external channel and outputs the second data to the second memory system through the internal channel, in a first simultaneous transfer mode that is entered by the host, and outputs the first and second data to the host through the first external channel in a first sole transfer mode that is entered by the host, and wherein the second memory system, in the first simultaneous transfer mode, outputs the second data inputted from the first memory system through the internal channel, to the host through the second external channel.

12. The data processing system according to claim 11, wherein the first memory system, when the first simultaneous transfer mode is entered, according to read requests from the host, reads the second data from the first nonvolatile memory device to a first internal bus at a first time and outputs the second data loaded in the first internal bus, to the second memory system through the internal channel, and reads the first data to the first internal bus at a second time subsequent to the first time and outputs the first data loaded in the first internal bus, to the host through the first external channel, and when the first sole transfer mode is entered, according to read requests from the host, reads the first data from the first nonvolatile memory device to the first internal bus at the first time and outputs the first data loaded in the first internal bus, to the host through the first external channel, and reads the second data to the first internal bus at the second time and outputs the second data loaded in the first internal bus, to the host through the first external channel.

13. The data processing system according to claim 12, wherein the second memory system, when the first sole transfer mode is entered, at a third time earlier than the first time or later than the second time, according to a read request from the host, reads third data from the second nonvolatile memory device to a second internal bus and outputs the third data to the host through the second external channel, and when the first simultaneous transfer mode is entered, receives the second data inputted through the internal channel at the first time, to the second internal bus, and outputs the second data to the host through the second external channel.

14. The data processing system according to claim 13, wherein the first memory system, in the first sole transfer mode, opens the first internal bus and the internal channel.

15. The data processing system according to claim 14, wherein the host, when a read or write request to the second memory system is not scheduled for at least a preset time from a time when read-requesting the first and second data to the first memory system, enters the first simultaneous transfer mode.

16. The data processing system according to claim 13, wherein the second memory system, when receiving read requests for fourth and fifth data from the host, outputs the fourth data to the host through the second external channel and outputs the fifth data to the first memory system through the internal channel, in a second simultaneous transfer mode that is entered by the host, and outputs the fourth and fifth data to the host through the second external channel in a second sole transfer mode that is entered by the host, and the first memory system, in the second simultaneous transfer mode, outputs the fifth data inputted from the second memory system through the internal channel, to the host through the first external channel.

17. The data processing system according to claim 16, wherein the second memory system, when the second simultaneous transfer mode is entered, according to read requests from the host, reads the fifth data from the second nonvolatile memory device to the second internal bus at a fourth time and outputs the fifth data loaded in the second internal bus, to the first memory system through the internal channel, and reads the fourth data at a fifth time subsequent to the fourth time and outputs the fourth data loaded in the second internal bus, to the host through the second external channel, when the second sole transfer mode is entered, according to read requests from the host, reads the fourth data from the second nonvolatile memory device to the second internal bus at the fourth time and outputs the fourth data loaded in the second internal bus, to the host through the second external channel, and reads the fifth data to the second internal bus at the fifth time and outputs the fifth data loaded in the second internal bus, to the host through the second external channel, and the first and second times and the fourth and fifth times do not overlap with each other.

18. The data processing system according to claim 17, wherein the first memory system, when the second sole transfer mode is entered, at a sixth time earlier than the fourth time or later than the fifth time, according to a read request from the host, reads sixth data from the first nonvolatile memory device to the first internal bus and outputs the sixth data to the host through the first external channel, when the second simultaneous transfer mode is entered, receives the fifth data inputted through the internal channel at the fourth time, to the first internal bus, and outputs the fifth data to the host through the first external channel, and the first to third times and the fourth to sixth times do not overlap with each other.

19. The data processing system according to claim 18, wherein the first memory system, in the first sole transfer mode, opens transfer of data from the first internal bus to the internal channel, and closes transfer of data from the internal channel to the first internal bus, and the second memory system, in the second sole transfer mode, opens transfer of data from the second internal bus to the internal channel, and closes transfer of data from the internal channel to the second internal bus.

20. The data processing system according to claim 19, wherein the host, when a read or write request to the second memory system is not scheduled for at least a preset time from a time when read-requesting the first and second data to the first memory system, enters the first simultaneous transfer mode, and when a read or write request to the first memory system is not scheduled for at least the preset time from a time when read-requesting the fourth and fifth data to the second memory system, enters the second simultaneous transfer mode.

\* \* \* \* \*